Sept. 1, 1964   J. WOLLENHAUPT ETAL   3,146,636
FEED TRANSMISSION FOR ELECTRICALLY CONTROLLED MACHINE TOOLS
Filed Jan. 28, 1959   16 Sheets-Sheet 3

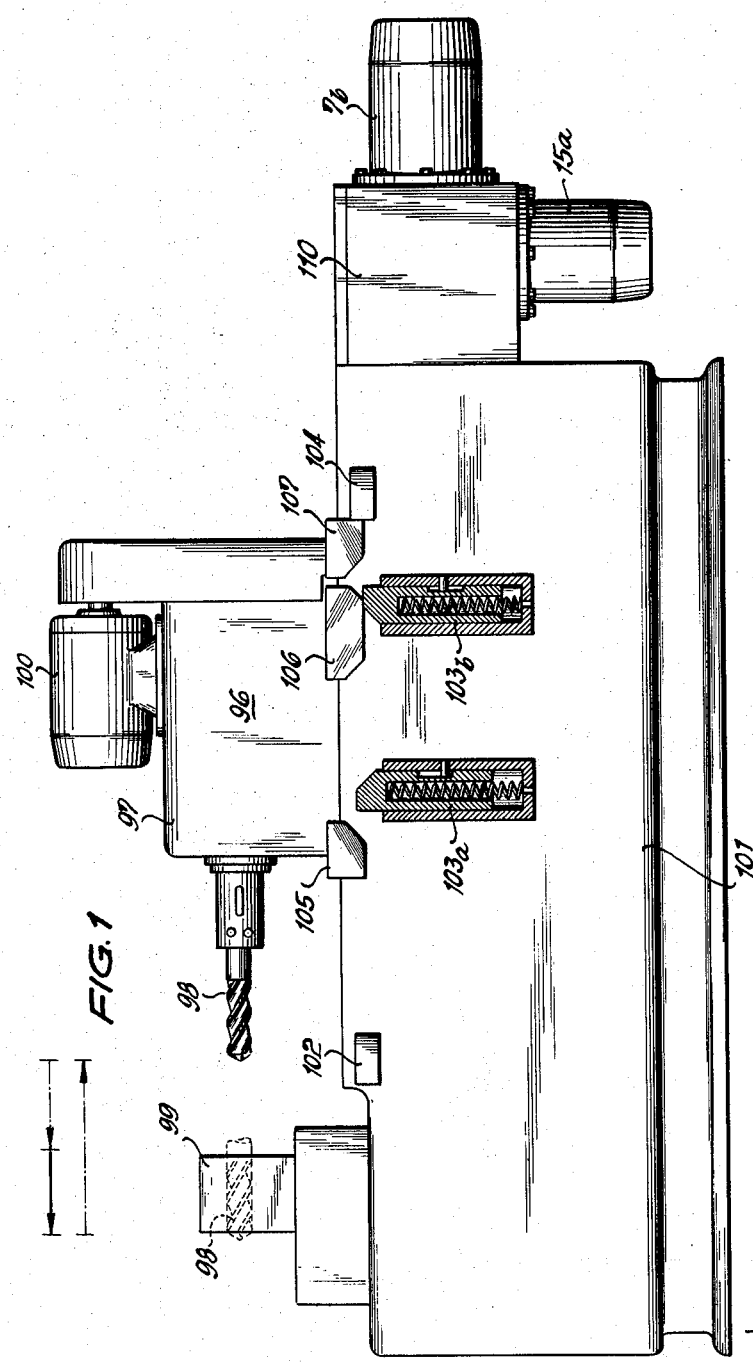

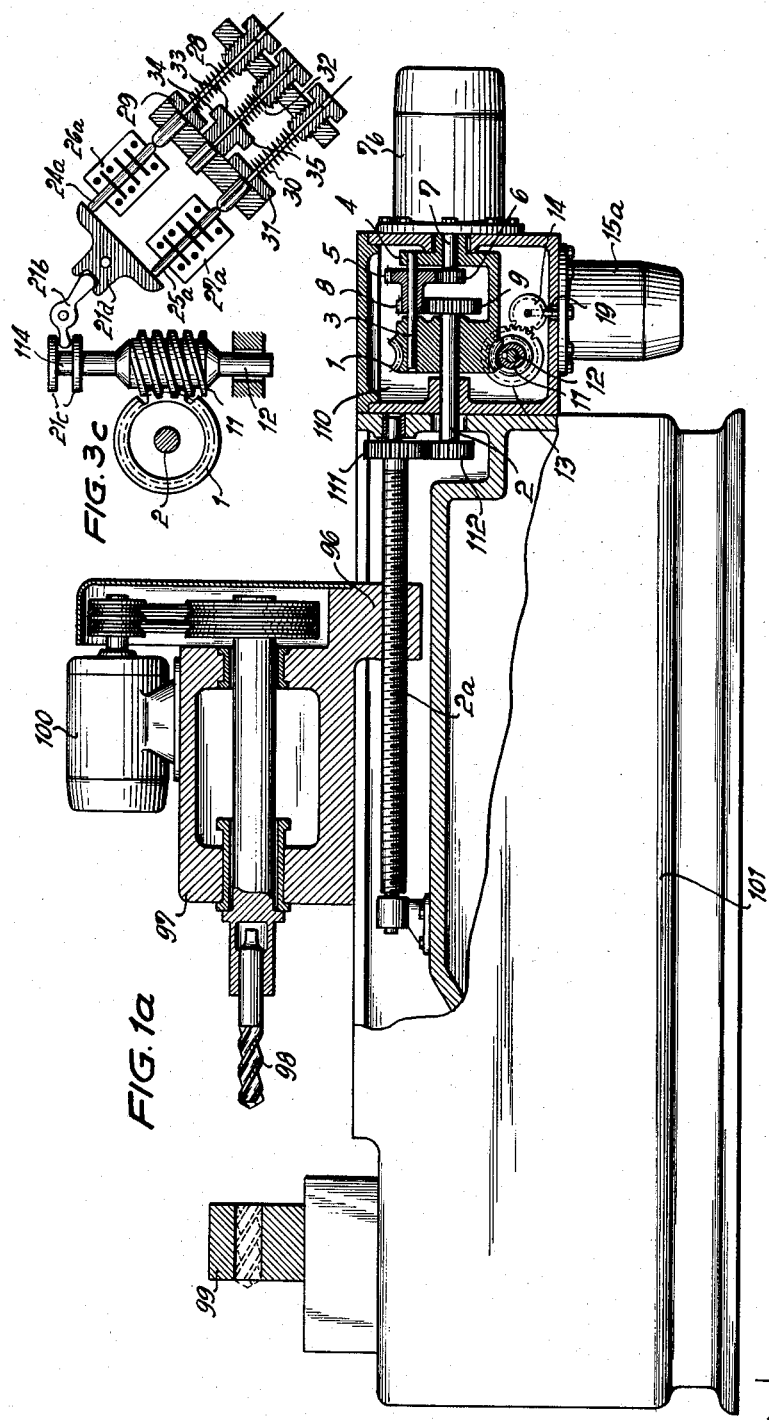

INVENTORS
Jakob Wollenhaupt
Kurt C. Maecker
By Arthur Zuhn
Patent Agent

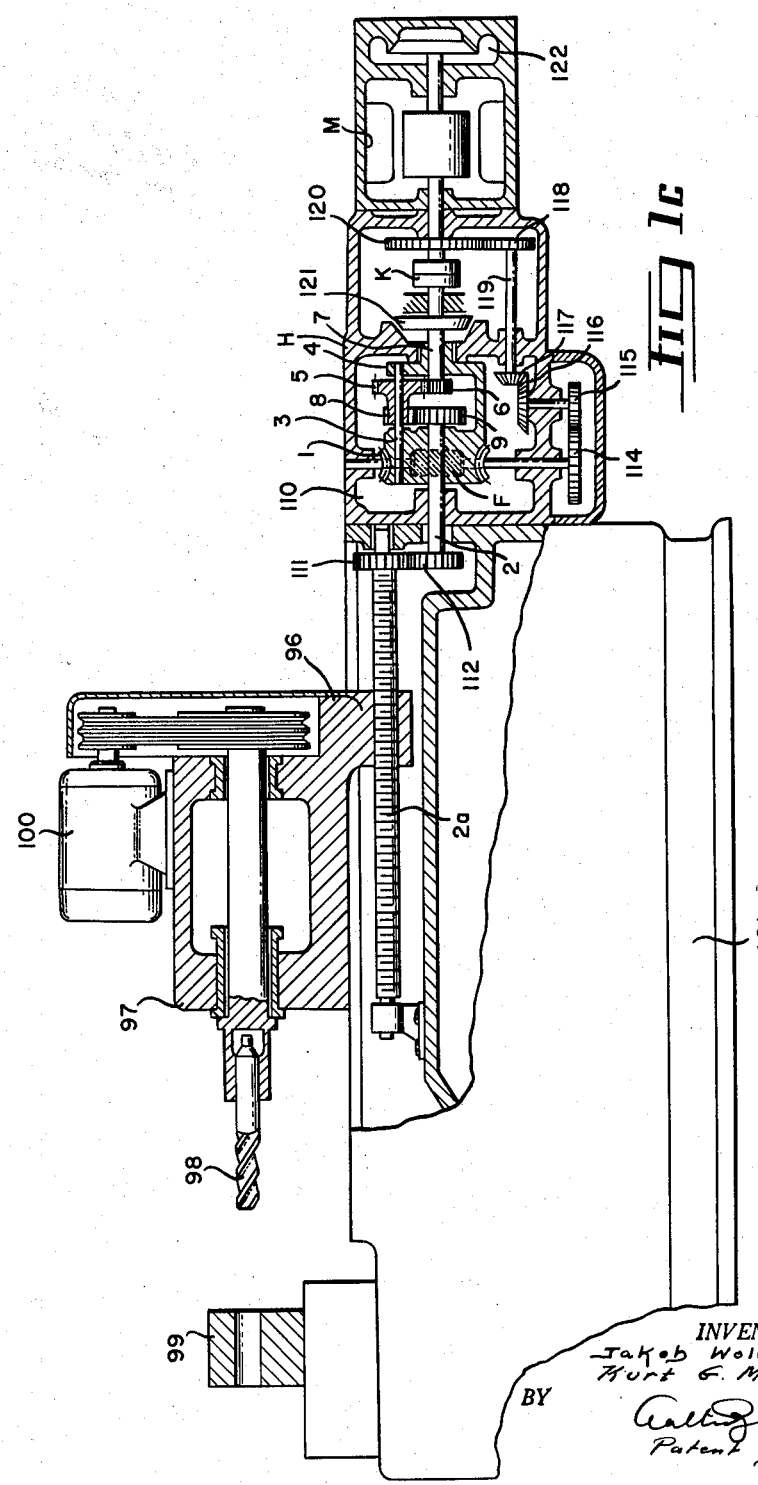

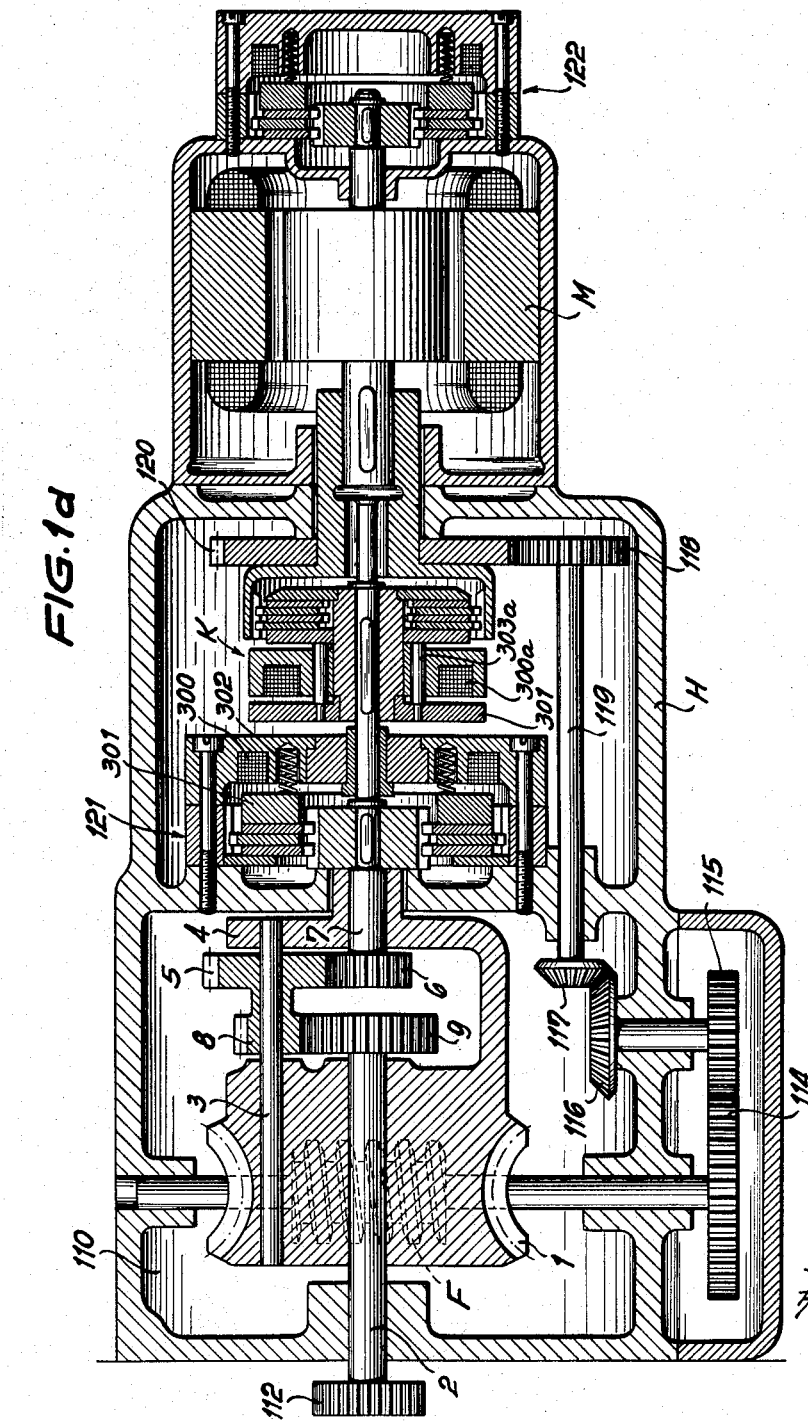

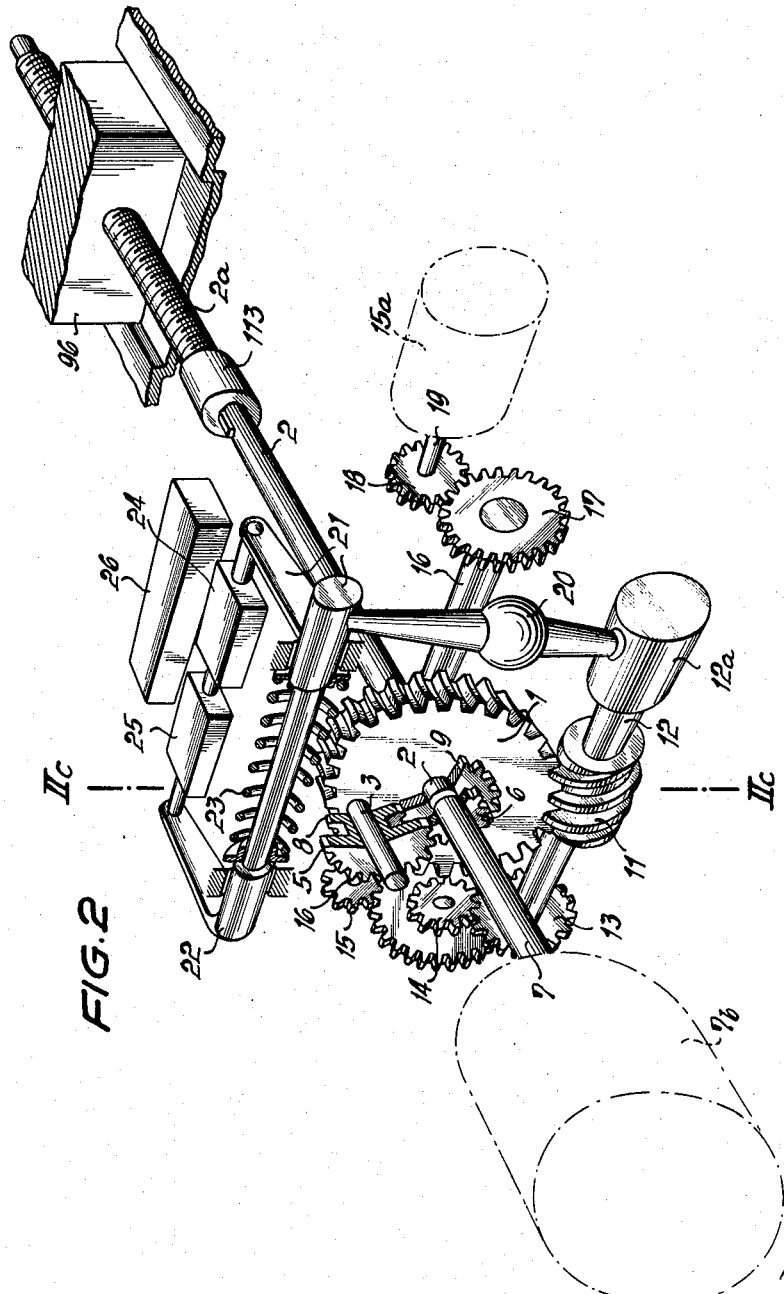

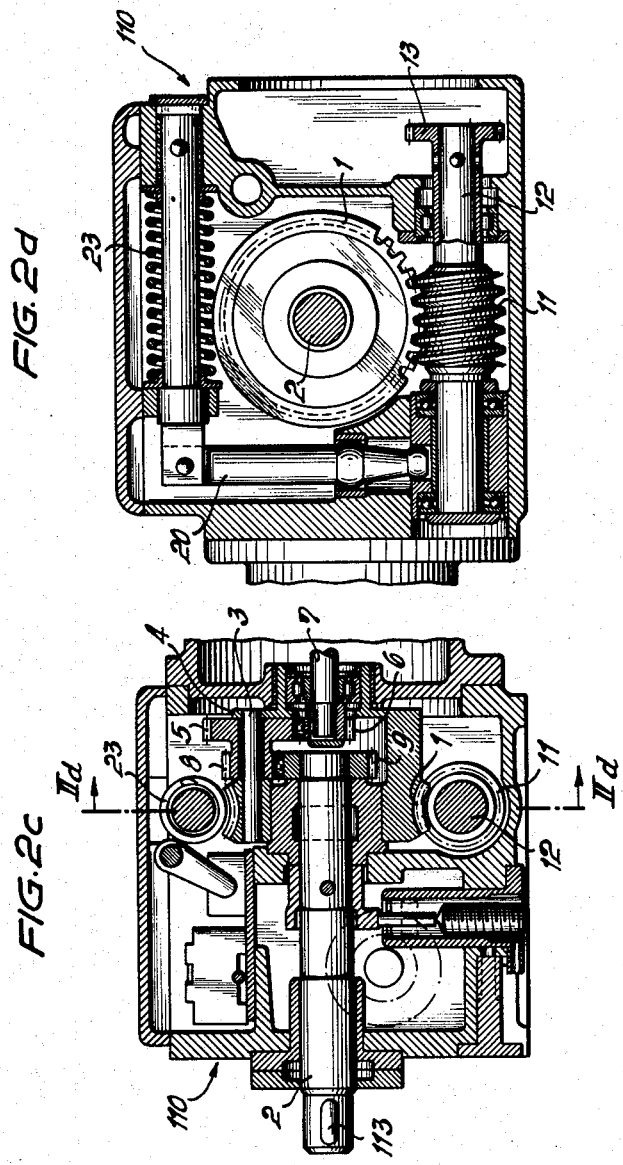

Sept. 1, 1964  J. WOLLENHAUPT ETAL  3,146,636
FEED TRANSMISSION FOR ELECTRICALLY CONTROLLED MACHINE TOOLS
Filed Jan. 28, 1959  16 Sheets-Sheet 8

INVENTORS
Jakob Wollenhaupt
Kurt G. Maecker
By
Patent Agent

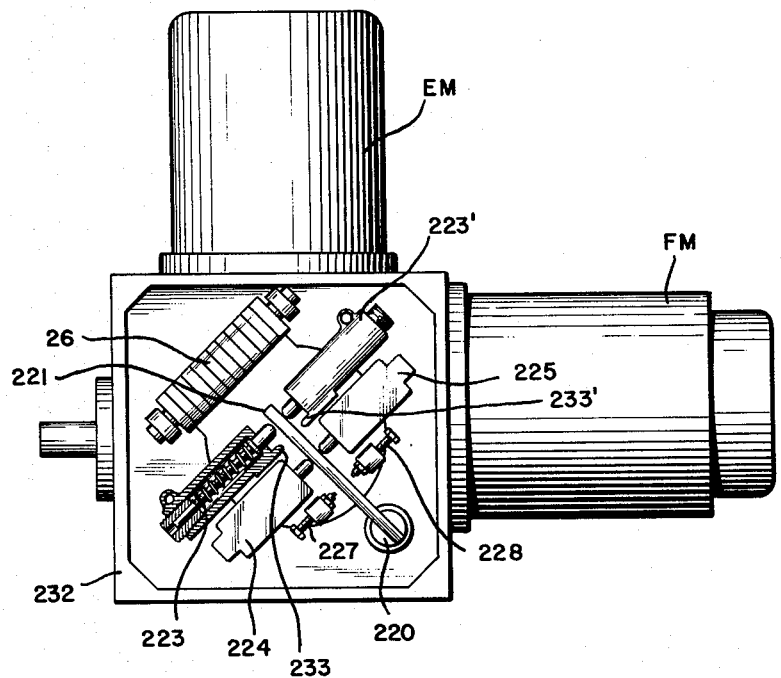

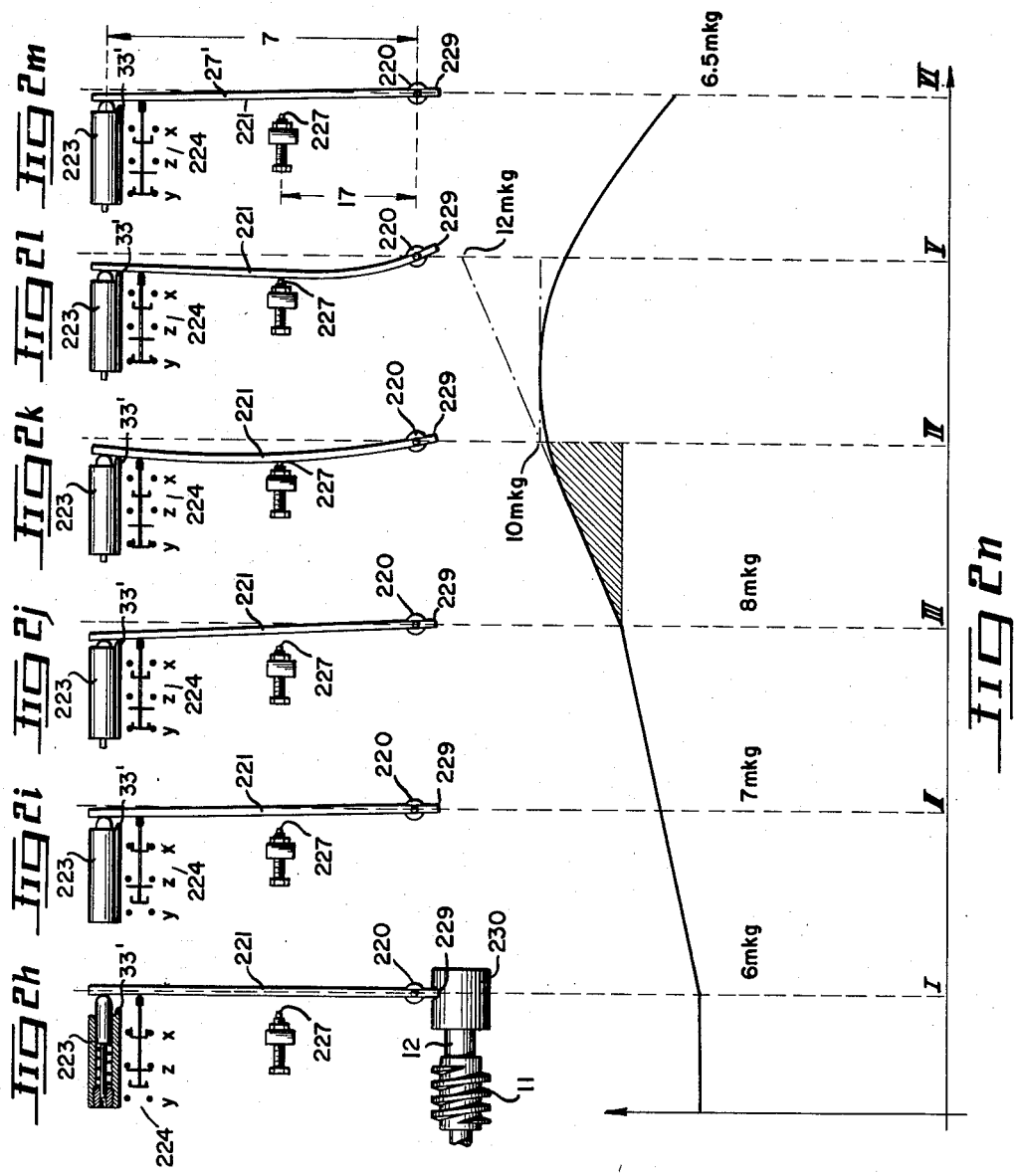

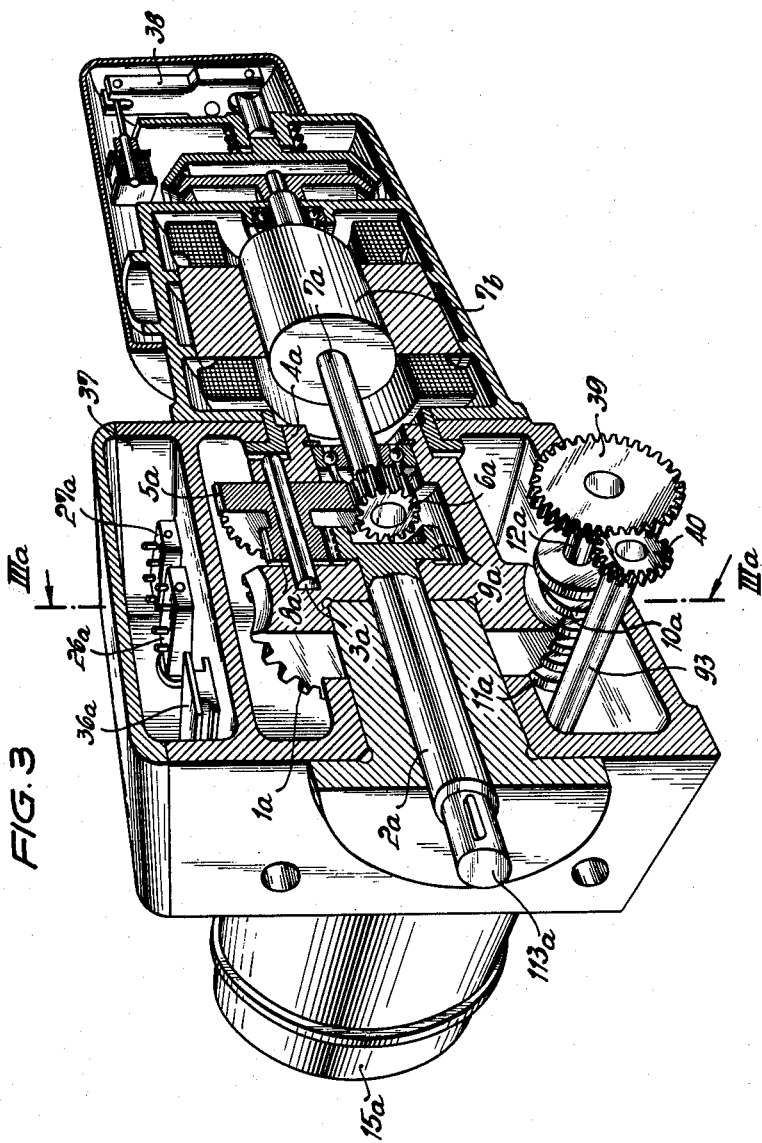

FIG. 3a
FIG. 3b
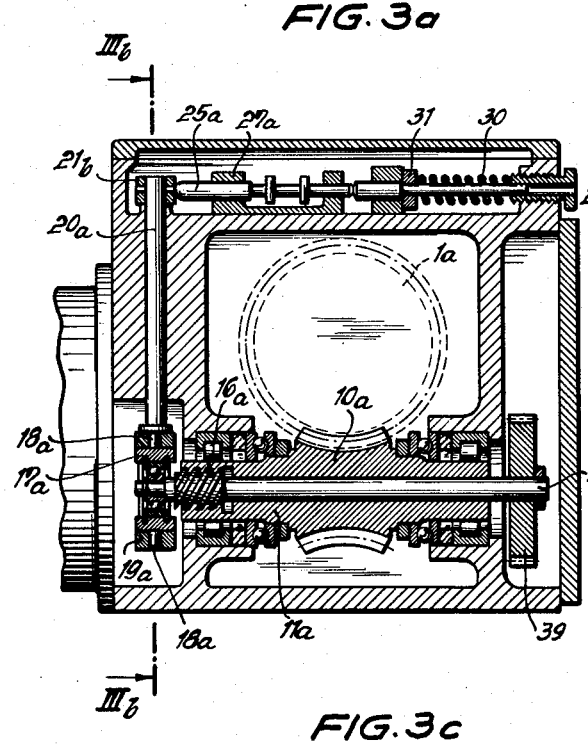
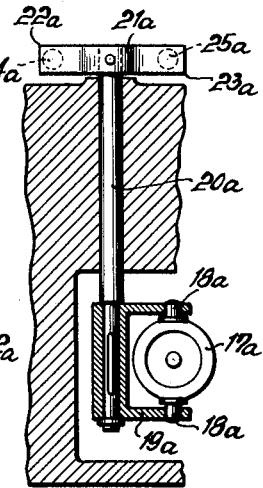
FIG. 3c
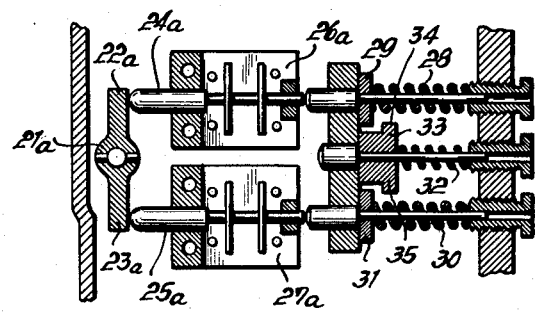
INVENTORS
Jakob Wollenhaupt
Kurt G. Maecker
By
Patent Agent Sept. 1, 1964  J. WOLLENHAUPT ET AL  3,146,636
FEED TRANSMISSION FOR ELECTRICALLY CONTROLLED MACHINE TOOLS
Filed Jan. 28, 1959  16 Sheets-Sheet 14

INVENTORS
Jakob Wollenhaupt
Horst E. Maecker
By
Patent Agent

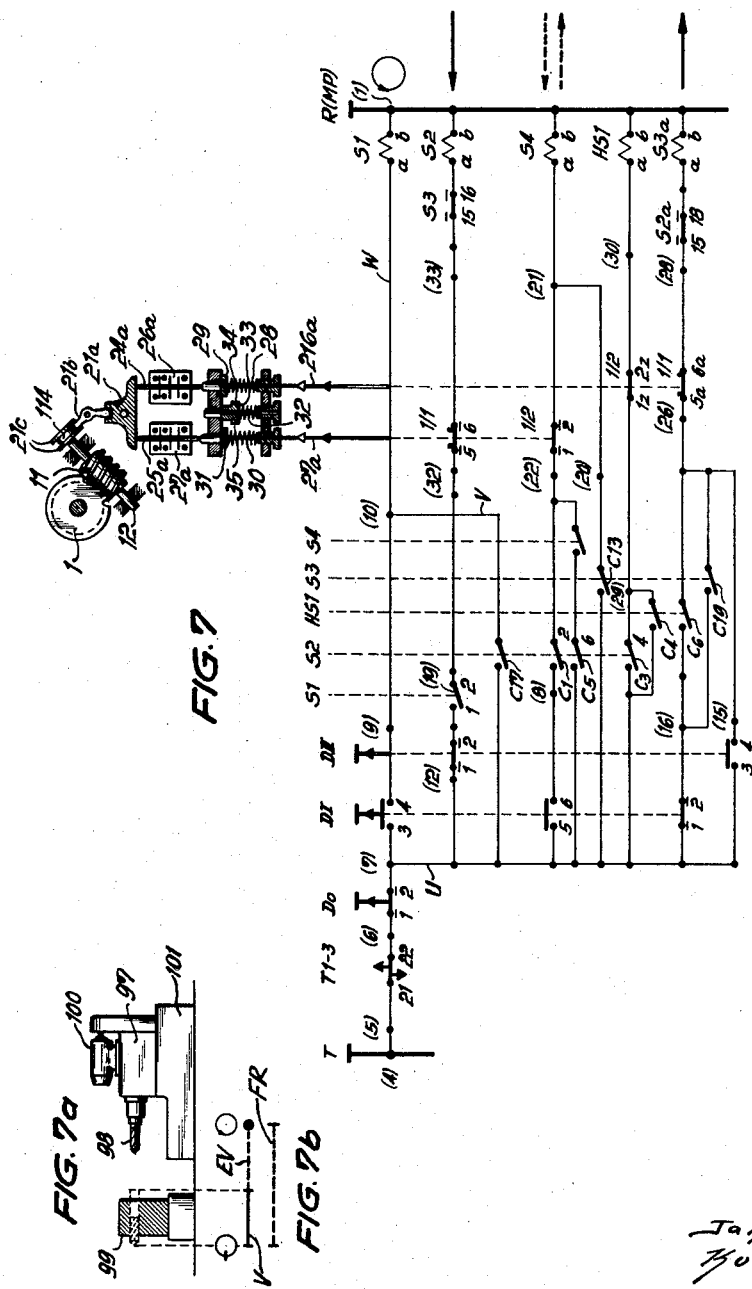

United States Patent Office 3,146,636
Patented Sept. 1, 1964

3,146,636
FEED TRANSMISSION FOR ELECTRICALLY
CONTROLLED MACHINE TOOLS
Jakob Wollenhaupt, Cologne-Bruck, and Kurt G.
Maecker, Dusseldorf, Germany, assignors to
Gebruder Honsberg, Remscheid-Hasten, Germany
Filed Jan. 28, 1959, Ser. No. 789,740
In Germany Oct. 2, 1948
Public Law 619, August 23, 1954
Patent expires Oct. 2, 1968
23 Claims. (Cl. 74—675)

The present invention relates to a feed transmission for electrically controlled machine tools and is a continuation-in-part application of our co-pending application Ser. No. 280,908, filed April 1, 1952, now abandoned.

The machining of work pieces requires a continuous control of the feed spindle with regard to the direction of movement as well as with regard to the respective speed. It is for this reason that the transmissions of mechanically controlled machine tools are rather complicated if a plurality of diversified operations and jobs have to be carried out. A considerable simplification in this respect has been obtained by electrically controlling such transmissions, inasmuch as a part of the control is effected by the electric motor itself. An electric motor is particularly well suited for such control, inasmuch as, for instance, the reversal in the direction of movement of the spindle can be obtained by simply reversing the motor. Nevertheless, in order to be able to control the various diversified machining operations occurring with the various chip-removing machine tools, it was still necessary, prior to the present invention, to employ various transmission constructions which differ considerably in design and structure from each other. More specifically, the transmissions of such machines generally form an integral part of such machines, and the designs of such transmissions are selected in close adaptation to the respective machine. Thus, such transmissions are constructed so that they will be able to perform the controlling operations for the specific machine only.

It is, therefore, an object of the present invention to provide a motor-transmission combination as a single packaged unit which can be attached to any chip-removing machine tool as a unit and can selectively be detached therefrom as a unit, while it will be possible by means of such unit to produce the required control operations of the respective machine tool to which said unit is connected.

It is another object of this invention to provide an independent motor-transmission combination unit as set forth above which will be relatively simple and can easily be connected to and detached from any chip-removing machine tool intended for drilling, turning, milling, cutting, planing and other machine tool operations.

These and other objects and advantages of the invention will appear more clearly from the following specification in connection with the accompanying drawings, in which:

FIG. 1 diagrammatically illustrates a view of a machine tool equipped with a packaged motor-transmission unit according to the invention.

FIG. 1a illustrates a section through the machine of FIG. 1.

FIG. 1c illustrates an arrangement which substantially corresponds to that of FIG. 1a with the exception that the feed and fast traverse motors of FIG. 1a have been replaced by a single drive motor.

FIG. 1d illustrates on an enlarged scale the brake shown in FIG. 1c and also the operation of said brake.

FIG. 2 is a perspective view showing schematically the operative components of FIGURE 1.

FIG. 2c is a section through the transmission according to the invention, said section being taken along the line IIc—IIc of FIG. 2.

FIG. 2d is a section taken along the line IId—IId of FIG. 2c.

FIG. 2g is a top view of a leaf spring acting as resilient transmisison element between the abutments.

FIGS. 2h to 2m respectively illustrate the various phases when moving against the fixed abutment.

FIG. 2n illustrates the torque graph of the output shaft in the various phases corresponding to the phases of FIGURES 2h to 2m.

FIG. 3 is a perspective view of a modified motor-transmission unit according to the invention.

FIG. 3a is a section taken along the line IIIa—IIIa of FIG. 3.

FIG. 3b is a section taken along the line IIIb—IIIb of FIG. 3a.

FIG. 3c is a top view of the embodiment according to FIG. 3a with the top lid removed therefrom.

Figure 4:
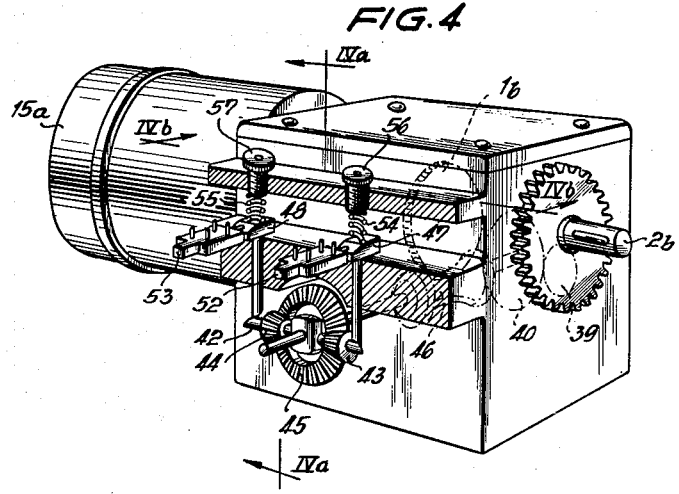

FIG. 4 is a perspective view of still another embodiment of a motor-transmission unit according to the invention.

Figure 4A:
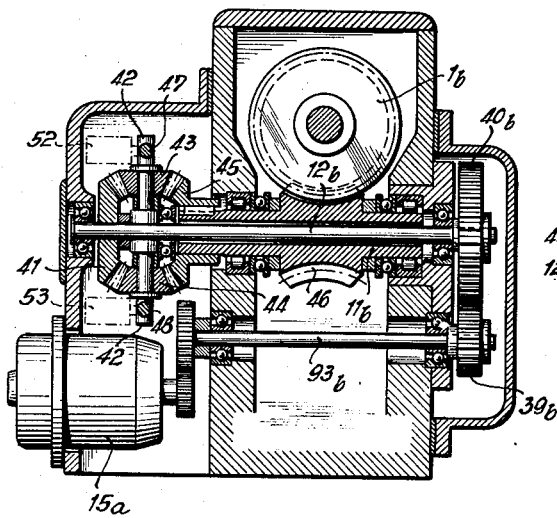

FIG. 4a is a section along the line IVa—IVa of FIG. 4.

Figure 4B:
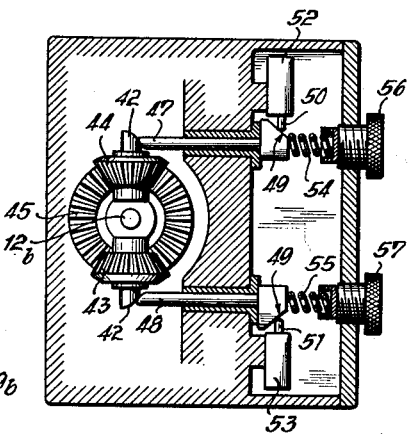

FIG. 4b is a section taken along the line IVb—IVb of FIG. 4.

Figure 5:
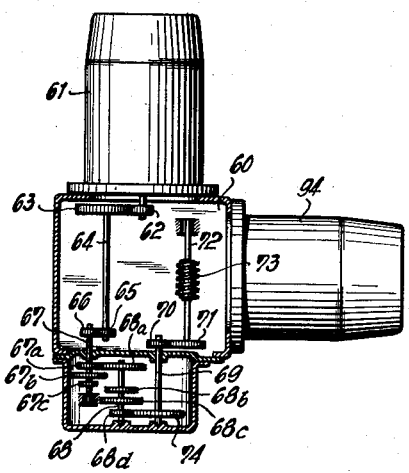
Figure 5A:
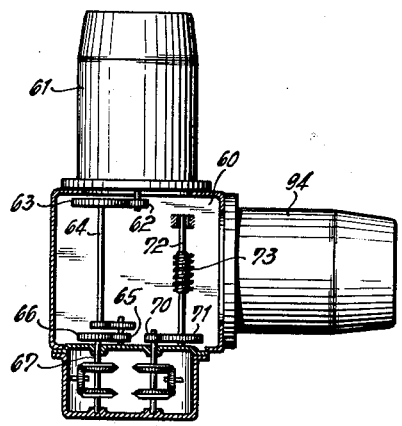
Figure 5B:
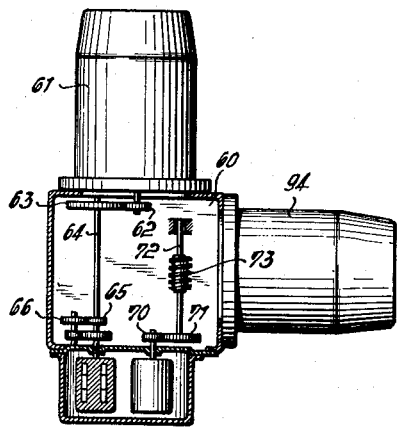
Figure 5C:
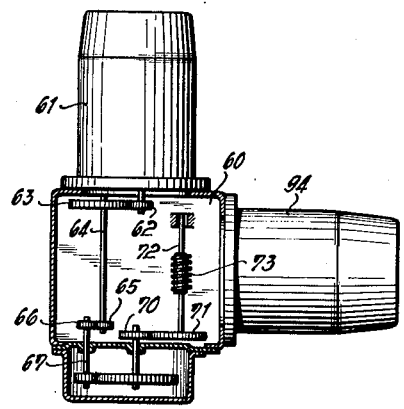
Figure 5D:
Figure 6:
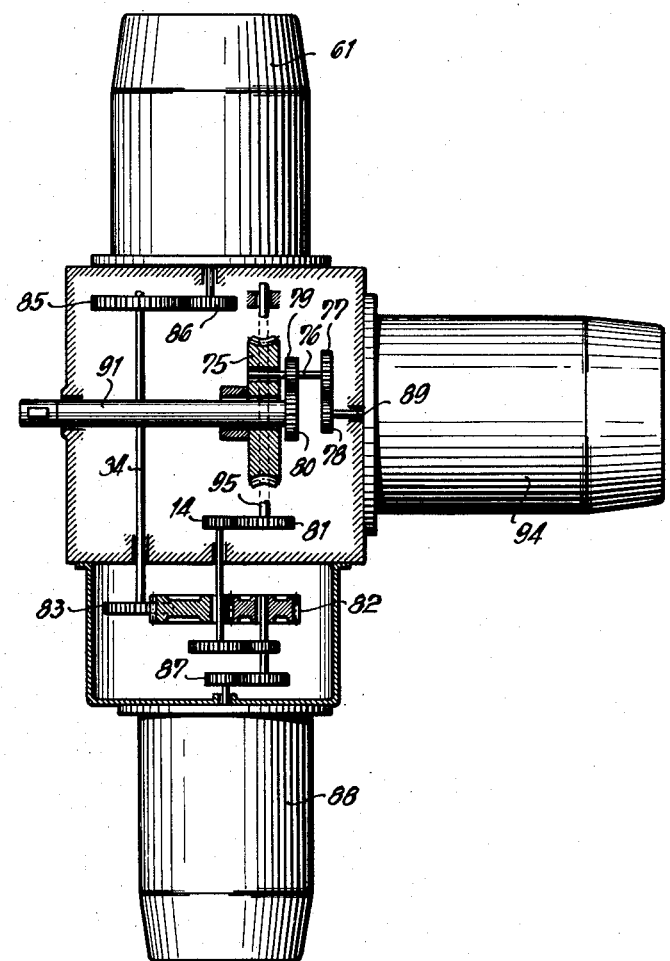

FIGS. 5, 5a, 5b and 5c as well as FIG. 6 illustrate further modifications of the present invention.

FIG. 7 represents a control circuit illustrating the control of a machine equipped with a motor-transmission unit according to the invention.

FIGS. 7a and 7b diagrammatically illustrate a drilling operation.

General Arrangement

As indicated above, a motor-transmission unit according to the present invention must be so designed that it will contain control means for controlling any operation which may occur in chip-removing machine tools so that it may be connected to any machine tool respectively comprising means for drilling, turning, milling, cutting, planing etc., without requiring any structural changes in such machines. The invention is based on the following considerations:

(a) The stopping and reversing of the feeding movement with machine tools of various types must be effected with utmost precision.

(b) Such precision can be obtained only by abutment with fixed abutments.

(c) With drilling operations and also with milling operations as well as with countersinking, chamfering and planing, precisions are required for the stopping and reversing of a feeding movement which can be obtained only by moving against fixed abutments.

Thus, the inventors have set themselves the problem of employing abutment methods known per se to the feeding transmission or to the transmission in general in such a manner that all controls can be originated by the transmission while simultaneously damage to the drive will be avoided.

Applicants have set themselves the further problem so to construct the transmission that the course of the working operations can be remote controlled and will be effected in a fully automatic manner. The release mechanisms controlled by the fixed abutments had to be so designed that they can be remote controlled without manual manipulation. At the same time, the release mechanisms have to be designed so that they could be employed for both directions of the carriage.

In conformity with one form of the present invention, the new transmission has associated therewith two driving motors, a fast traverse motor and a feed motor, which two motors work upon an output shaft through the intervention of a planetary gear transmission. The limit switch off and reversal of the machine is effected by movement of the movable under-structure of the machine such as the tool support or carriage or, more specifically, cams connected thereto against fixed abutments which are connected to the machine bed. The movements of the carriage will by adjustment of said cams and said abutments be precisely predetermined.

The various problems which the inventors have set themselves have been solved by building into the transmission a highly sensitive fixed abutment release which, when such abutment is hit or the maximum torque is exceeded or when a certain adjustable feeding pressure is exceeded, actuates electric contacts which bring about the switching off of the feed or the initiation of the fast traverse return or any of the other operations pertinent to the respective course or cycle of the machine operation. By means of the cams on the carriage and the fixed abutments on the machine bed, the individual controls are precisely preset, which means that the individual strokes to be carried out by the carriage are precisely predetermined.

*Structural Arrangement*

Referring now to the drawing in detail and FIGS. 1 to 2d thereof in particular, the structure shown therein comprises a machine tool having a bed 101 on which is mounted a drilling unit 97 having movable carriage 96 comprising a motor 100 for the working spindle and a drilling spindle 98 for drilling the work piece 99. On the righthand side with regard to FIG. 1 of the bed 101 is arranged the transmission unit 110 according to the invention which unit includes the feed motor 15a and the fast traverse motor 7b. The transmission unit includes a casing which may be detachable from bed 101. In order to predetermine the individual working operations, the work tool support or carriage is provided with cams. More specifically, in this instance there is provided a cam 105 for limiting the end of the forward stroke, and a cam 107 for limiting the end of the rearward stroke. In addition thereto there is provided a cam 106 for determining the length of the working feeding stroke. These cams co-operate with the fixed abutments 102 for the end of the forward stroke, the fixed located but yieldable abutments 103a and 103b for the working stroke (i.e. for two directions). The abutments 103a and 103b are resiliently mounted and yield downwardly when engaged by cam 106. Finally there is provided a fixed abutment 104 for the end of the rearward stroke.

FIG. 1a shows the arrangement of FIG. 1 in section. In addition to the parts described in connection with the description of FIG. 1, FIG. 1a also shows the feed spindle 2a which, when rotating, moves the carriage 96. The feeding spindle 2a is through the intervention of gears 111, 112 drivingly connected with the output shaft 2 which latter is adapted to be driven by the fast traverse motor 7b and the feed motor 15a. The transmission 110 according to the invention used in the arrangement of FIG. 1a is shown more specifically in FIG. 2 and will be described in detail further below.

Figure 1B:
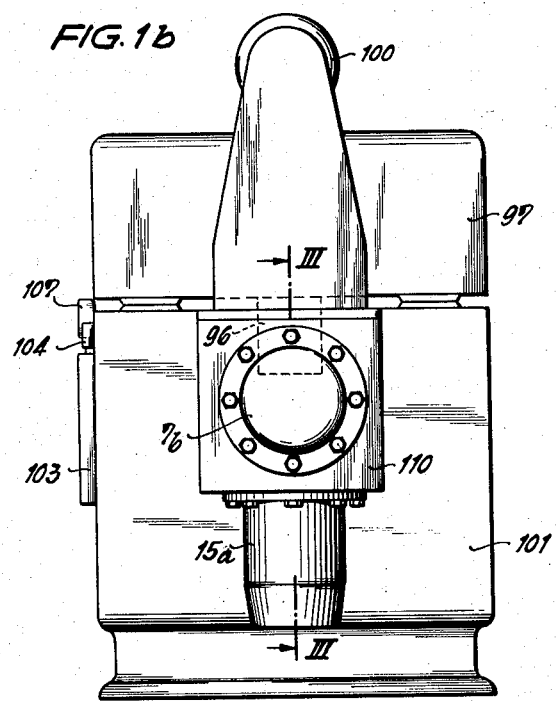
FIG. 1b is a side view of the machine of FIG. 1.

As will be seen from FIG. 1b representing a side view of FIG. 1, the transmission 110 is mounted on the machine bed 101 and comprises the feed motor 15a and the fast traverse motor 7b. The cam 107 for the rearward end and the abutments 103b and 104 are likewise visible in FIG. 1b.

Referring now to FIGURE 1c, which is a modification with a single motor, shaft 2 has freely rotatably mounted thereon the worm wheel 1 which carries planet shaft 3, the other end of which is mounted in a disc 4 which in its turn is journalled in the transmission housing H. Mounted on shaft 3 is a planetary gear wheel 5 which meshes with a pinion 6 keyed to shaft 7 of motor M. Fixedly connected to planetary gear wheel 5 is a planetary gear wheel 8 mounted on shaft 3. Wheel 8 meshes with pinion 9 which is keyed to the feed spindle 2. Meshing with worm wheel 1 is a worm F which is drivingly connected to shaft 7 of motor M through change gears 114, 115, bevel gears 116, 117, shaft 119 and gears 118 and 120. Interposed between gear 6 and motor M and mounted on shaft 7 are a brake 121 and a clutch K.

When the fast traverse speed has been made effective, motor M through clutch K and gear 6, 5, 8, and 9 drives feed spindle 2. When the feed is engaged, motor M is connected with worm wheel 1 through gears 120, 119, shaft 118, bevel gears 117, 116, change gears 115, 114 and worm F. Brake 121 absorbs the kinetic energy of motor M when the feed is being disengaged. In order to be able to disengage the fast traverse speed at a definite precise time, motor M has built thereinto a brake 122.

More, specifically, that portion of the machine of FIGURE 1c which contains brake 121 is shown on an enlarged scale in FIG. 1d. As will be evident from FIG. 1d, energizing of coil 300 causes armature 301 to be attracted against the thrust of spring 302. In this condition, the brake is disconnected. When the energizing current for coil 300 is interrupted, armature 301 is released again so that springs 302 compress the disc packet. In this condition the brake is engaged. With clutch K, coil 300a is energized. The current is fed to coil 300a through a sliding contact. Armature 301a is attracted in view of the energizing of coil 300a. As a result thereof, the clutch discs are compressed by pressure pins 303a so that in this instance clutch K is engaged. If coil 300a is not energized, clutch K is disconnected.

Referring now to the modification of FIG. 2, the carriage 96 is adapted to be driven by the feed spindle 2a which is connected with the output shaft 2 through the intervention of the sleeve 113. The output shaft 2 (also see FIG. 1) is adapted to be driven by the fast traverse motor 7b and by the feed motor 15a. Movably mounted on the output shaft 2 is a worm wheel 1 carrying a shaft 3 one end of which is journalled in a disc (not shown). Shaft 3 has mounted thereon a planetary gear 5 which meshes with and is adapted to roll on a sun wheel 6 fixedly connected to shaft 7 of the fast traverse motor 7b. The planetary gear 5 is fixedly connected to a pinion 8 which meshes with a sun gear 9. The sun gear 9 is fixedly connected to the output shaft 2. It will thus be evident that by means of the said parts 1, 3, 5, 6a connection is established between the fast traverse motor 7b and the feed spindle 2a.

The worm wheel 1 directly meshes with a worm 11, a so-called axially movable worm, which is fixedly connected to a shaft 12. One end of shaft 12 has fixedly connected thereto a gear 13 which meshes with a change gear 14 of a change gear transmission, which serves for selecting the desired speeds of the feed. Change gear 14 has connected thereto a change gear 14' which meshes with a pinion keyed to a shaft 16 the other end of which has keyed thereto a gear 17. The gear 17 meshes with a pinion 18 fixedly connected to shaft 19 of the feed motor 15a. By means of these members there is also established a connection between the feed spindle 2a with the feed motor 15a.

Shaft 12 on which the worm 11 is mounted has that end thereof which is remote from the gears 13, 14 provided with a lever 20 which is movably inserted into the portion 12a of shaft 12. The lever 20 is connected to two shift levers 21 and 22. A preloaded spring 23 is interposed between the levers 21 and 22. The shift levers 21 and 22 are adapted to actuate two limit switches 24 and 25 respectively. Terminals 26 are located behind the said two switches 24 and 25.

When moving the carriage of the machine tool or when moving a working unit against an abutment 102, 103, 104, the preload of spring 23 is overcome so that the worm 11 together with its shaft 12 is displaced. As a result thereof, the lever 20 inserted into the portion 12a of shaft 12 presses spring 23 in one direction so that the shift lever at one side of spring 23, i.e. either lever 21 or lever 22, depending on the direction of movement of shaft 12, actuates the limit switch pertaining thereto, i.e. either limit switch 24 or limit switch 25. Due to the actuation of one or the other limit switch, the feed motor is reversed or stopped. When moving the carriage in the opposite direction, that limit switch is actuated which cooperates with the respective abutment.

The pre-loaded spring 23 may be exchanged and may be adjusted precisely to the respective desired pressure or force. In this way, it is possible in conformity with th invention to vary the feed pressure. In addition to the abutment control, it is also possible with the embodiment shown in FIG. 1 to initiate a certain operation as soon as the feed pressure has exceeded a certain value. Thus, if for instance, a rough surface is to be counter sunk to a desired depth, the spring is so adjusted that, when the countersinking tool abuts the still rough surface, the worm 11 will due to the increasing feed pressure move against the thrust of spring 23 thereby switching on a timing mechanism which is precisely gauged in millimeters to the respective drilling depth. After expiration of the time controlled by the timing mechanism, the desired drilling depth has been obtained and the fast return movement is initiated.

Figure 2A:
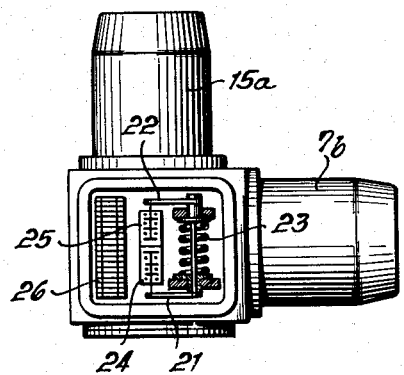
FIG. 2a illustrates on a scale reduced over that of FIG. 2 a top view of the arrangement of FIG. 2.

FIG. 2a illustrates spring 23 with the two shift levers 21 and 22 as seen from above and also shows the limit switches 24 and 25 pertaining thereto. The limit switches 24 and 25 are provided with three pairs of contacts in order to be able to control various steps. Adjacent the pair of limit switches 24, 25 there is provided the terminal strip 26.

Figure 2B:
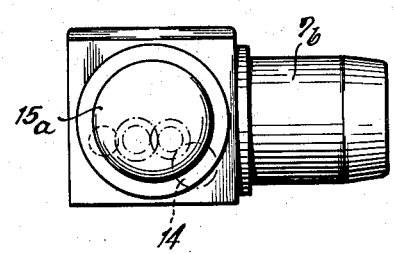
FIG. 2b is a side view, likewise on a reduced scale, of the arrangement shown in FIG. 2.

FIG. 2b shows the change gears for adjusting the speeds. The last change gear 14 illustrated in FIG. 2 is also indicated in FIG. 2b.

According to the invention, the transmission elements between the worm and the contacts or parts of these transmission elements are designed as resilient elements. This arrangement has the purpose to convey the kinetic energy or inertia of the feed motor being stopped in a shock-free manner to the brake of the fast traverse motor. After the feed motor has been switched off, the latter due to its inertia continues to run further until its inertia has been destroyed. The fast traverse motor is driven by the feed motor. Strong shocks will occur inasmuch as the fast traverse motor which is at a standstill is being accelerated to the speed corresponding to the speed of the feed motor in conformity with the transmission ratio, and since the said accelerating work has to be performed in a very short time.

The element which in conformity with the present invention is to be designed as a resilient element, may for instance be the shift lever for actuating the electric contacts which control the motor and the springs pertaining thereto. This shift lever may be designed as a leaf spring.

After this leaf spring has compressed the springs acting against the axial movement of the worm, and thereby has actuated the electric contacts, said leaf spring is further as spring subjected to stress and absorbs as much of the inertia of the dying out feed motor movement as corresponds to the accelerating work of the fast traverse motor. As a result thereof, the torque driving the fast traverse motor gradually increases to such an extent that the fast traverse motor will be put in motion. From that instant on at which the fast traverse motor has reached a speed corresponding to that of the feed motor, the brake in the fast traverse motor will absorb the entire remainder of the inertia of the dying out feed motor. After this shifting movement has been completed and when the leaf spring has absorbed as much energy as substantially corresponds to the accelerating work of the fast traverse motor, the spring characteristic of the leaf spring is changed by a second adjustable abutment to such an extent that the fast traverse motor already in its tilting or pull out torque point receives a slight shock and thus safely and softly starts its movement. The inertia of the dying feed motor is thus by the resilient member of the invention in a shock-free manner conveyed to the fast traverse motor whereby said inertia is destroyed by the slip of the brake.

An advantageous embodiment of the invention according to which the shift lever is designed as leaf spring will now be described in connection with FIGS. 2e to 2n.

Figure 2E:
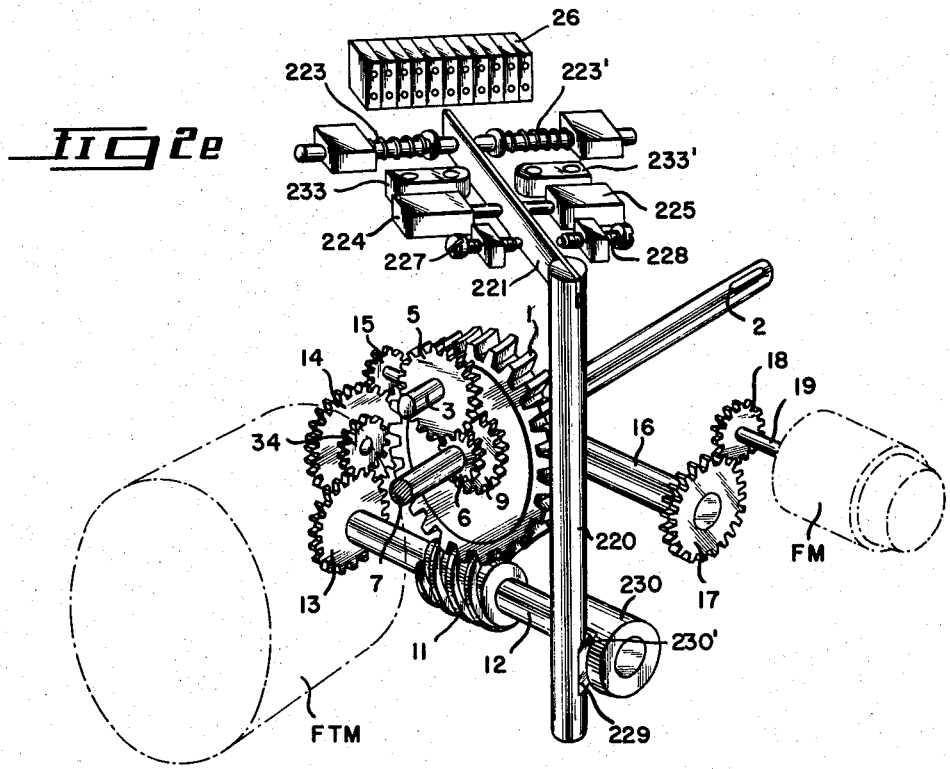
FIG. 2e represents a perspective illustration of a feed transmission according to the present invention.

With reference to FIG. 2e, it will be seen that shaft 2 has mounted thereon a worm wheel 1 carrying a shaft 3 the other side of which (not shown) is journalled in a disc (not shown) which in its turn is mounted in the transmission housing. Mounted on shaft 3 is a planetary gear wheel 5 meshing with a pinion 6 which represents the sun wheel of the planetary gear system. Pinion 6 is keyed to shaft 7 of a fast traverse motor FTM. Planetary gear wheel 5 is fixedly connected to a pinion 8 (not shown in FIG. 2e), said pinion meshing with gear 9 keyed to feed spindle 2a. Feed motor FM and fast traverse motor FTM actuate the spindle 2a through the planetary gear transmission and the feed worm.

Worm wheel 1 directly engages a worm 11 which is designed as an axially movable worm and fixedly mounted on a worm wheel shaft 12. Mounted on one end of shaft 12 is a gear 13 meshing with change gears 34, 14 and 15 adapted to adjust the speed for the feed. Change gear 15 is mounted on a shaft 16. That end of shaft 16 which is remote from gear 15 has mounted thereon a gear 17 meshing with a pinion 18 which latter is keyed to a shaft 19 of the feed motor FM.

Figure 2F:
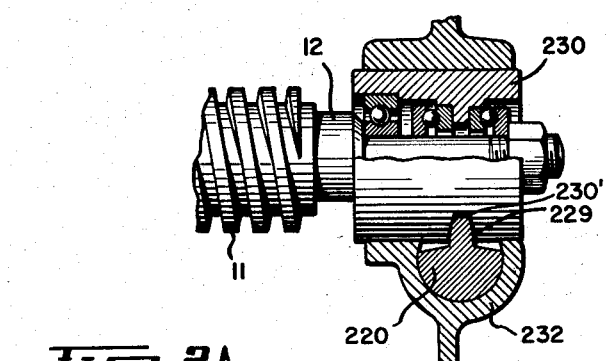
FIG. 2f shows the bearing for the worm shaft and the transmission elements for conveying the axial movement into a rotative movement, the bushing for the worm being partly cut open.

The control arrangement of FIGURE 2f comprises a bushing 230 receiving the end of the worm shaft 12 and provided with a groove 230' engaged by a tooth 229 of a rod 220; the upper end of rod 220 carries a leaf spring 221 which is fixedly clamped at one end thereof in rod 220. Both sides of leaf spring 221 rest against springs 223 and 223'. Adjacent these springs there are arranged two switches 224 and 225 and two fixed abutments 233 and 233' and two adjustable abutments 227 and 228.

When the carriage engages a fixed abutment, or when the maximum torque is exceeded or when a certain adjustable feed pressure is exceeded, worm 11 with its shaft 12 moves in axial direction. The axial movement of worm shaft 12 is conveyed to the limit switches 224 and 225 by transmission elements 220 and 221. The transmission rod 220 is rotatably journalled in the transmission housing 232 (FIG. 2g). Worm shaft 12 is rotatably but axially nondisplaceably journalled in the worm bushing 230. The bushing 230 is axially displaceable in the housing 232. The free lever arm of leaf spring 221 is arranged between the preloaded and adjustable springs 233 and 233′.

Intermediate the pivot point of leaf spring 221 and the points of attack of springs 223 and 223′ are electric switches 224 and 225. These switches are slightly spaced from the sides of leaf spring 221 in such a way that they will be actuated when one of the springs 223 or 223′ has been compressed by leaf spring 221. When the shift operation has been completed, spring 221 will rest against one of the fixed abutments 233 or 233′. The fixed and adjustable abutments are arranged between the pivot of leaf spring 221 and the point of attack of the electric switches 224 and 225 in such a way that leaf spring 221 will rest against one of the fixed abutments and one of the adjustable abutments when one of the springs 223 or 223′ has been compressed and one of the switches 224 or 225 has been actuated.

Due to the axial movement of worm 11, for the above mentioned reasons, through the intervention of worm shaft 12 and worm bushing 230, the tooth 229 of the lever 220 is tilted together with the latter. As a result thereof, also leaf spring 221 is turned so that it will act against one of the springs 223 or 223′. If, in this connection, the axial movement of worm 11 is so great that the adjustable spring force of one of the springs 223 or 223′ will be exceeded, leaf spring 221 will be turned to such an extent that it actuates switch 224 or 225. As a result thereof, the feed motor FM will be switched off and further commands are given or initiated.

The inertia or energy of the dying feed motor FM brings about a further axial movement of worm 11 and thereby a further turning movement of leaf spring 221. Leaf spring 221 will during this further turning movement first abut one of the adjustable abutments 227 or 228 while it will now bend with reduced lever arm, i.e. increased stiffness.

Leaf spring 221 absorbs as much inertia of the dying feed motor as is required by the fast traverse motor in order to obtain the speed of the feed motor. As mentioned above, the feed motor acts upon the fast traverse motor. Inasmuch as the speed of the fast traverse motor amounts to a fraction only of that of the feed motor, the adjustable abutments on the leaf spring have to be adjusted in such a way that the fast traverse motor will reach a speed corresponding to that of the feed motor.

By adjusting the leaf spring by means of the abutments 227 and 228, the occurring shocks in the transmission can be precisely calculated and limited. The arrangement according to the invention thus brings about a saving of the transmission and assures a safeguard of the transmission and its transmitting elements against shocks. Furthermore, this arrangement makes it possible to carry out the fixed abutment method with utmost precision. In addition thereto, a transmission can be designed with relatively small dimensions for a high torque.

In order to show how the shocks are absorbed, FIGS. 2h to 2n illustrate the individual phases of the abutment method. FIG. 2h shows the torque at normal feed, i.e. at a load of 6 mkgs. According to FIG. 2i the carriage has reached an abutment. The load has increased to 7 mkgs. The leaf spring has already actuated the breaker contact b in switch 224 or 225 and has turned off the feed motor. The slip torque of the fast traverse brake has been obtained. According to FIG. 2j the leaf spring 221 abuts the abutment 223. The limit switch 224 has been actuated, i.e. the closing contact x of switch 224 has been opened and contact y has been closed. In the fourth phase illustrated in FIG. 2k, leaf spring 221 is bent further in view of the inertia of the dying feed motor and has reached the abutment 227. The switch position does not change. Leaf spring 221 absorbs as much energy as is necessary in order to accelerate the fast traverse motor to the low speed of the dying feed motor, for instance to a speed of $n=60$ r.p.m. The energy absorbed by leaf spring 221 is illustrated on the torque curve of FIG. 2n and is indicated by a shaded surface. The adjustability of abutment 227 makes it possible to maintain the accelerating step and thereby the increasing torque within said range.

If abutment 227 is incorrectly adjusted as shown in FIG. 2l, spring 221 bends further. This creates a safety zone. Leaf spring 221 will then due to the suddenly reduced spring length from L to $L_1$ have a steeper characteristic and will now act as push spring. If, for instance, the fast traverse shaft after reaching abutment 227 has not been put in motion but is in the neighborhood of the so-called tilting point or pull out torque point, a slight push suffices to put the fast traverse shaft into motion. In view of the spring effect, the push or shock is also in this instance not hard. Finally, FIG. 2m shows that the inertia of the dying feed motor has been destroyed by actuation of the fast traverse brake. The force accumulated in leaf spring 221 has been unloaded into the brake. The pressure against the fixed abutment is now produced by spring 223 only and can be maintained constant within the range of the adjustability of this spring.

As a numerical example for FIGS. 2h to 2n the following values are stated:

Cmkgs.
Inertia of the dying feed motor (at $n=1500$ r.p.m.) _____ 300
Acceleration energy for the fast traverse motor (at $n=60$ r.p.m.) _____ 2.5
Absorption capability of leaf spring 221 between the abutments 227 and 231 _____ 2–4
Absorption capability of the safety zone _____ 4

The absorpion capability of the fast traverse brake is practically unlimited. In the particular example above referred to, the fast traverse brake absorbs 297.5 cmkgs.

FIG. 2n illustrates the torque curve pertaining to FIGS. 2i to 2m. The abscissa has plotted thereon the shifting stages of the abutment shifting arrangement, whereas the ordinate has plotted thereon the torque on the output shaft in mkgs. The individual shifting stages corresponding to the FIGS. 2h to 2m are designated with the roman numerals I to VI in FIG. 2n and precisely correspond to the loads indicated thereover.

It is advantageous so to dimension the leaf spring 221 that when working against springs 223, 223′ and when actuating the switches 224, 225, it will bend only immaterially and will only after engaging one of the abutments 227, 228 bend considerably for purposes of absorbing work.

Referring now to the modification shown in FIGS. 3, 3a, 3b and 3c, those parts thereof which correspond to similar parts of the arrangement of FIG. 2 have been designated with the same reference numerals but with the additional character a. As will be seen from FIG. 3, the arrangement shown therein comprises a worm wheel 1a freely rotatably mounted on the output shaft 2a while a shaft 3a is carried by said worm wheel 1a. Shaft 3a is mounted in a disc 4a rotatable in the transmission housing. Mounted on the shaft 3a is a planetary gear wheel 5a meshing with a pinion 6a which latter is fixedly connected to shaft 7a of the fast traverse motor 7b. Connected to planetary gear wheel 5a is a planetary gear wheel 8a, both gears being on shaft 3a. The planetary gear wheel 8a meshes with the pinion 9a which is keyed to the output shaft 2a.

In contrast to the embodiment of FIG. 2, the worm wheel 1a of the embodiment of FIG. 3 does not mesh with a movable worm but meshes with the thread of a globoidal worm 10a which is mounted on a hollow worm shaft 11a (FIG. 3a) in which the drive shaft 12a is movably and rotatably journalled. One end of shaft 12a has connected thereto a change gear 39 which through a change gear 40 keyed to a counter shaft 93 is drivingly connected with the feed motor 15a. That end of the drive shaft 12a which is remote from the change gear 13a (see FIG. 3a) is provided with helical teeth 16a engaging complementary teeth inside hollow worm shaft 11a and which connects the feed motor 15a with the worm wheel 1a. The drive shaft 12a is by means of antifriction bearings journalled in a ring 17a which by means of two studs 18a is at two sides connected to a link member 19a. Keyed to the link member 19a is one end of a shaft or rod 20a the other end of which carries a transverse lever 21a. Ends 22a and 23a of said lever 21a contact the two shifter bolts 24a and 25a of the limit switches 26a and 27a. The shifter bolt 24a of the limit switch 26a works against the thrust of a spring 28 which rests against the disc 29. The shifter bolt 25a of the limit switch 27a works against the thrust of a spring 30 which rests on a disc 31. Arranged between the springs 28 and 30 is a spring 32 with the member 33. The member 33 has two protruding portions 34 and 35 which form abutments for the spring discs 29 and 31 pertaining to the springs 28 and 30 respectively. The spring 32 makes it possible to shift the switches in two stages. More specifically, when the shifter bolt 25a of the limit switch 27a moves downwardly with half the power, the abutment 31 will rest against the abutment 35. However, when the shifter bolt moves downwardly with full force, it will press the abutment 33 downwardly against the thrust of spring 32. FIG. 3 furthermore shows the terminal strips 36a which together with the limit switches 26a and 27a are built into the auxiliary casing 37. FIG. 3 also shows the brake 38 for the fast traverse motor 7b which brake is released by electromagnetic means.

The principle of operation of the embodiment of FIG. 3 is essentially the same as that of the embodiment of FIG. 2. The helical teeth 16a mesh with the hollow worm shaft 11a thereby driving the worm shaft with the feed worm. The springs 28, 30 and 32 behind the limit switches are pre-loaded to such an extent that, when both motors 7a and 15a are in operation, the drive shaft 12a, the worm shaft 11a, and the worm wheel 1a will be in equilibrium. When one of the cams 105, 106 and 107 of the carriage hits one of the abutments 102, 103 and 104, the helical teeth 16a screw themselves out of the hollow worm shaft 11a in view of the fact that the globoidal worm cannot displace itself, whereby the rod 20a is tilted in one direction. One of the ends 22a, 23a of lever 21a contacts a shifter bolt 24a or 25a of the limit switch 26a or 27a so that a shifting operation is initiated by the tilting movement of the rod 20a.

The globoidal worm makes it possible to convey great forces inasmuch as at one and the same time a plurality of teeth are in mesh. Therefore, this worm has a very high degree of efficiency. The thrust of the three springs 28, 30 and 32 may be adjusted from the outside in any desired manner. The intermediate spring 32 located between the two springs 28 and 30 furnishes the possibility for establishing a pre-contact as has been set forth above. When actuating either shifter bolt 24a or shifter bolt 25a, the spring 28 or 30 behind the limit switch 26a or 27a respectively is first compressed to such an extent that its disc 29 or 31 respectively abuts the abutment 34 or 35 respectively pertaining to the spring 32. At this instant, the spring 32 becomes effective. This spring 32 is adapted to cooperate with spring 28 as well as with spring 30.

A further embodiment of the invention is illustrated in FIGS. 4, 4a and 4b. The principle of operation is essentially the same as that described in connection with the embodiments of FIGS. 2 and 3. Those parts of the embodiment of FIG. 4 which correspond to similar parts in FIGS. 2 and 3 have been designated with the same reference numerals but with the additional reference character .b. Similar to the arrangement of FIGS. 2 and 3, a worm wheel 1b is movably mounted in the transmission housing on the shaft of the output spindle 2b. The worm wheel 1b one end of a planet shaft (not shown) the other end of which is mounted in a disc (not shown) arranged in the housing. Mounted on the planet shaft is a planetary gear wheel (not shown) meshing with a sun wheel (not shown) which latter is keyed to the output shaft of the fast traverse motor (not shown). Planetary gearing (not shown) connects the worm wheel with the feed spindle 2b. With the embodiment according to FIGS. 4, 4a and 4b, the feed motor 15a drives a shaft 12b through the intervention of a counter shaft 93b and change gears 39b and 40b, said shaft 12b being journalled in the hollow worm shaft 11b. A bevel gear 41 is mounted on that end of the drive shaft 12b which is remote from the change gear 39b. The bevel gear 41 drives the bevel gear 45 and thereby the worm 46 through the intervention of planetary gear wheels 43 and 44 on coaxial shafts 42, said bevel gear 45 being keyed to the worm shaft 11b. The ends of shaft 42 engage two push rods 47 and 48 respectively which are provided with inclined surfaces 49. As will be evident from FIG. 4b, the surfaces 49 of the push rods 47 and 48 contact the shifter bolts 50 and 51 of the two limit switches 52 and 53 respectively. The push rods 47 and 48 rest against two pre-loaded springs 54 and 55 the thrust of which may be adjusted from the outside by means of screws 56 and 57 respectively.

The drive shaft 12b thus, through the intervention of a bevel gear differential, drives the hollow worm shaft 11b and thereby the globoidal worm 46. The two ends of shaft 42, through the intervention of the two push rods 47 and 48 and the inclined surfaces 49 thereof, contact the shifter bolts 50 and 51 of the limit switches 52 and 53 for the forward end and the rearward end. The push rods 47 and 48 respectively rest against the two pre-loaded springs 54 and 55 which are respectively associated with the fixed abutment release for the forward end and rearward end.

During the operation of the machine, drive shaft 12b and globoidal worm 46 are in equilibrium with the worm wheel 1b and the two springs 54 and 55. When the carriage hits one of the abutments 102, 103 and 104, the thrust of one of the two springs 54 or 55 is overcome. Thus the shafts 42 are tilted toward one side whereby the respective push rod 47 or 48 is lifted and thus actuates the respective limit switch 52 or 53 pertaining thereto. Due to the fact that the fixed abutment release mechanism, namely, the shafts 42 of the bevel gear differential, is located in front of the feed worm, it will not be affected by the degree of efficiency of the worm. The fixed abutment release mechanism is, therefore, extremely sensitive. The shifting force corresponds approximately to the torque of the worm without the interposition of a conductor. Thus, the shifting can be precisely adjusted. The magnitude of the switching off torque may be adjusted by adjusting the thrust of the spring from the outside in any desired manner.

With the last two embodiments of the invention according to FIGS. 3 and 4, the control stroke of the drive shaft 12a or 12b is relatively short. It is not longer than is necessary for carrying out the control movement. After the control movement has been completed, the feed motor 15a while being switched off still requires a certain time to come to a complete stop and to dissipate its own kinetic energy. This movement between the switching off of the motor and the coming to a complete stop is made possible according to the present invention by the arrangement that the feed motor 15a drives the fast traverse motor 7b through the planetary gear transmission and is held stationary by means of a brake (38 in FIG. 3) which is adjusted for the maximum torque of the transmission. When said maximum torque is exceeed, brake 38 slides and thereby make possible a shock-free absorption of the kinetic energy left in the feed motor 15a after it has been switched off.

The brake 38 furthermore serves as safety device against overloads. The feeding power which is determined by adjustment of the fixed abutment spring or fixed abutment springs when using a plurality of such springs, may thus be held considerably lower in conformity with the desired requirements than the maximum feeding power determined by the maximum torque. If desired, the said feeding power may be reduced even to zero, inasmuch as the fixed abutment spring or springs is or are not required for destroying the kinetic energy left in the feed motor after it has been switched off.

With all embodiments described so far, the fixed abutment-release mechanisms with switches and terminals, in other words the entire switching mechanisms of the motors are built into the transmission.

The change gears which are employed for adjusting the speeds, i.e. the feeding speed, and of which some change gears (14 and 15) as shown in FIG. 2, may be exchanged whereby the feeding speed may be varied.

According to the present invention, the exchangeable or removable change gears may be replaced by an auxiliary transmission arranged within the feed transmission and housed together with the latter in a casing. A plurality of such auxiliary transmissions are respectively shown in FIGS. 5, 5a, 5b and 5c. Such auxiliarly transmission is likewise a packaged unit which is independent and can be independently connected to or disconnected from a machine tool. The casing is provided with a centering portion by means of which it is properly aligned with regard to the housing of the feed transmission and may be flanged to the latter. Any desired transmission may be used as auxiliary transmission whereby it is made possible to employ the feed transmission for universal machines.

In FIGS. 5, 5a, 5b and 5c, the feed transmission which has been described in connection with FIGS. 2, 3 and 4 in various forms is designated with the reference numeral 60. The feed motor has been designated with the reference numeral 61, whereas the fast traverse motor has been designated with the reference numeral 94. Keyed to the shaft of the feed motor 61 is a pinion 62 meshing with a gear 63 which in its turn is keyed to a shaft 64. The other end of shaft 64 has keyed thereto a pinion 65 which, if no auxiliary transmission were connected to the feed transmission 60, would mesh with the first one of the change gears 14 which are employed for the adjustment of the feeding speed and which, when an auxiliary transmission is desired, may be removed.

If, therefore, as shown in FIG. 5, instead of the removed change gears, an auxiliary transmission has been flanged to the feed transmission casing, the pinion 65 meshes with a gear 66 which is keyed to a shaft 67. The shaft 67 has three shift gears 67a, 67b and 67c used for shifting three speeds. The said three shift gears 67a, 67b and 67c are adapted by means of a shifting device (not shown) to be brought into meshing engagement with the change gears 68a, 68b and 68c mounted on shaft 68. These change gears are drivingly connected with a further shaft 69 through the intervention of the pinion 68d on shaft 68. Shaft 69 has keyed thereto a pinion 70 meshing with a gear 71. The gear 71 is mounted on shaft 72 with the displaceable worm 73 by which through shifter levers, the automatic limit switching off and limit switching over device for the driving motors is actuated as has been described in connection with FIGS. 2, 3 and 4.

If no auxiliary transmission is employed, the last one of the now removed change gears meshes with the gear wheel 66 of the shaft 67. Instead of the three speed steps, also six, twelve or more speed steps or velocity ranges may be employed. The auxiliary transmission is built into a box which by means of a centering portion is flanged to the casing of the feeding transmission 60.

Instead of the shifter wheel transmission shown in FIG. 5, also other transmissions known per se may be employed as auxiliary transmissions in conformity with the present invention. FIG. 5a illustrates an infinitely variable transmission, while FIG. 5b illustrates a fluid transmission. FIG. 5c shows a Geneva cross transmission. The respective auxiliary transmission is always connected to the pair of gears 65, 66 which dirvingly connects the auxiliary transmission with the shaft of the feeding motor. On the other hand, the auxiliary transmission is always connected with shaft 72 through a pair of gears 70, 71. Mounted on shaft 72 is a worm 73 which also connects the auxiliary transmission with the limit switch off and reversing mechanism for the drive motors.

The auxiliary transmission may also consist of a motor with a differential. Such an arrangement is shown in FIG. 6 in which a worm wheel 75 is freely rotatably mounted on the driving spindle 91. The worm wheel 75 through shaft 76, planetary gear wheel 77 and pinion 78 is drivingly connected with shaft 89 of the fast traverse motor 94 and through gears 79–80 in drivingly connected with the driving spindle 91. One end of shaft 95 that carries the driving worm for worm wheel 25 has keyed thereto a gear 81 which with the ordinary embodiment meshes by means of a pinion 14 with the first change of the feed transmission. With the embodiment according to FIG. 6, the gear 81 form the driving member for the planetary gear transmission 82 the output gear member 83 of which is mounted on shaft 84 which is drivingly connected with the shaft of the feed motor 61 through gears 85 and 86. The other end of the shaft 95 has mounted thereon a shifter lever (not shown) which through two further shifter levers and a pre-loaded spring (see FIG. 2 spring 23) brings about the automatic switching off and reversing of the feed motor. The planetary gear transmission 82 is driving connected through a pinion 87 to the auxiliary motor 88 which according to FIG. 6 has been selected as a single speed motor.

If the feed motor 61 rotates at a speed of 750 r.p.m. and the auxiliary motor 88 has such a stepdown transmission that it operates at 250 r.p.m., an auxiliary transmission which according to the invention consists of a planetary gear transmission 82 and auxiliary motor 88 yields the following possibilities for four different speeds:

(1) Feed motor by itself—$n=750$ r.p.m. (auxiliary motor is at a standstill);

(2) Feed motor and auxiliary motor together—$n=1000$ r.p.m. (auxiliary motor moving in rightward direction);

(3) Feed motor and auxiliary motor together—$n=500$ r.p.m. (auxiliary motor running in left-hand direction);

(4) Auxiliary motor alone—$n=250$ r.p.m. (feed motor standing still).

As feeding motor and also as auxiliary motor a pole reversible motor with a plurality of speeds may be selected. As a result thereof further possibilities of changing the speed are obtained.

The assembly or connecting of the auxiliary transmission is very simple inasmuch as it can take the place of the removable change gears.

The various shifting combinations obtained by the auxiliary transmission in conformity with the present invention, may be arranged in the control and may automatically become effective in a desired sequence. It is also possible to design the arrangement in such a manner that the shifting operation is automatically effected for some speeds and is manually effected for the remaining speeds. This may be brought about by a selector switch. The manually operable combinations are then held in reserve and may be made effective in conformity with requirement. This is expedient when certain control operations are effected frequently whereas other control operations are employed only in few instances.

In order to furnish a precise picture of the course of the controls with a transmission according to the invention, there will now be described the control of the simplest working operation namely of the so-called one stroke. This one stroke consists of the following movements of the carriage "fast traverse forward" up to the work piece, "feed forwards" for carrying out the machining, and subsequently "fast traverse backwards" for returning the slide to its starting position.

The control circuit is illustrated in FIG. 7, while FIG. 7a shows the drilling unit 97 including tool 98, with the working spindle motor on the machine bed 101 and the work piece 99. The reference numerals are the same as in FIG. 1. Below FIG. 7a there is diagrammatically shown in FIG. 7b the course of the above mentioned working cycle.

More specifically, in FIG. 7b, the dash line designated EV designates the fast traverse forward movement. Adjacent thereto in full line and designated with V is shown the feeding stroke. Below the lines V and EV is shown again in dash line the fast traverse return stroke FR.

Again referring to FIG. 7, this figure shows at the top portion thereof the two limit switches 26a and 27a of FIG. 3a with the lever 21a. As shown in the drawing, lever 21a is operated by a link 21b which has one end engaging an annular groove 114 fixedly arranged on shaft 12 supporting the movable worm 11. The worm 11 is likewise shown in FIG. 7 as meshing with the worm wheel 1 on shaft 7. The arrangement involved in this instance comprises two springs and an intermediate spring as described in connection with FIG. 3. In this same manner as in FIG. 3c, the two springs are designated with the reference numerals 28 and 30 respectively and have an intermediate spring 32 for the intermediate sleeve 33 inasmuch as the switches have three switch stages as is also evident from FIG. 2.

The circuit proper as shown in FIG. 7 comprises the relays S1 for the working spindle, the relays S2 and S3 for the leftward feed, the relay S4 for fast traverse toward left and right and the relays S2a and S3a for the rightward feed. The circuit furthermore comprises an auxiliary relay HS1 the purpose of which will be set forth further below.

The circuit furthermore comprises the push button switches Do for stop, DI for forward and DII for rearward. If the switch DI for forward is pressed, the energizing circuit for relay S1 or the working spindle is closed. As a result thereof, the contactor switch 19 of the relay S1 closes, thereby closing the circuit for the forward feeding relay S2 through the contacts 5-6 of the limit switch 27a. As a result thereof, the carriage starts its movement toward the left.

Energization of the relay S2 causes the contactor switch c17 to close thereby establishing a holding circuit for relay S1, said holding circuit comprising the main line T, conductor U, conductor V, conductor W and main line R.

When de-energizing the relay S2, simultaneously also the relay S1 will be de-energized so that the working spindle will be switched off.

Energization of the relay S2 also caused its contactor switches c1, c5 and c3 to close. Closure of the contactor switch c1 closes the energizing circuit for the fast traverse relay S4. The relays receive their voltage behind the reversing relays S2a, S3 so that the fast traverse motor will always move in the direction determined by the reversing relay S3 and S3a. Inasmuch as the energization of the relay S2 closed contactor switch c5 and inasmuch as the energization of the relay S4 closed the contactor switch c18, a holding circuit is established for the relay S4 to hold the same energized when the push button DI is released. Energization of the relay S2 also closes its contactor switch c3 thereby energizing the auxiliary relay HS1. Energization of the relay HS1 causes its contactor switch c4 to close which closes a shunt for the contactor switch c3. The energization of the auxiliary relay HS1 has no effect at this time.

The carriage now moves at fast traverse speed toward the left until the cam 106 hits upon the resilient abutment 103a (FIG. 1). The shifter bolt 25a (FIG. 7) of the limit switch 27a is now lowered by half the stroke only namely only until the abutment 31 of this shifter bolt hits the abutment 35 for the intermediate spring 33. This movement by half the stroke thus causes the limit switch 27a merely to open the contacts 1-2 (see drawing one-half stroke). Opening of the contacts 1-2 breaks the energizing circuit for the fast traverse relay S4. The carriage thus continues its feeding movement toward the left as long as the cam 106 presses the abutment 103a (FIG. 1) downwardly at half force. At the end of the feeding movement, the shifter bolt 25a is depressed completely so that worm 11 will slide and at this time with full force. As a result thereof, the limit switch 27a now opens its contacts 5-6 and thereby breaks the energizing circuit for the relay S2 for the leftward feed so that its contactor c17, c1, c5 and c3 open. The cam 105 has now arrived at its fixed abutment 102 (FIG. 1). Thus, the carriage has reached its outermost left-hand position and it will now be necessary to make the rightward movement effective. This reversal of the feeding movement to feeding rightwardly is brought about by the relay S3a. As previously mentioned, the auxiliary relay HS1 is at present energized so that also its contactor switch c6 closes. Consequently when now the limit switch 26a is actuated so that it closes its contacts 5a-6a, relay S3a is energized while the opening of the contacts 5-6 through the limit switch 27a as previously stated had brought about de-energization of the relay S2 and thereby the end of the feed in the leftward direction. The deenergization of the relay S2 also causes the auxiliary contacts 15-16 to close, and inasmuch as the contactor switch c6 of the auxiliary relay HS1 had closed before, the relay S3a is now energized. Energization of the relay S3a closes its contactor switch c19 thereby establishing a holding circuit for the relay S3a. Energization of the relay S3a also causes its contactor switch c13 to close thereby closing the energizing circuit for the fast traverse relay S4. The carriage now moves at fast traverse speed toward the right.

When the carriage has reached its right-hand end position, its cam 107 hits the abutment 104. At this instant, due to the sliding of the worm 11 toward the other direction, the limit switch 26 is actuated so that the shifter bolt 24a is pressed to such an extent that the abutment 34 of the spring disc 33 is pressed downwardly. As a result thereof, the energizing circuit for the auxiliary relay HS1 is de-energized in view of the opening of the contacts 1z-2z of the limit switch 26a. Similarly the relay 3a is de-energized in view of the opening of the contacts 5a, 6a of the limit switch 26a. Finally also the energizing circuit for the relay S4 is broken in view of the fact that due to the de-energization of the relay S3a its contactor switch c13 has opened. Thus, the machine comes to a standstill.

The second resilient cam 103b shown in FIG. 1 is required if a working operation is to be effected in both directions for instance for the working sequence "pendulum-like stroke" according to which the carriage alternately moves toward the right and toward the left in order to carry out a certain type of machining. This resilient cam 103b may with the simple working sequence "single stroke" as described in the preceding paragraphs also be employed in order to bring about a smooth starting of the machine.

The reduction in the speed would in this instance be brought about by causing the working cam 106 when hitting the resilient cam 103b to switch off the fast traverse speed so that the carriage during the feeding operation would have its cam 106 hit the abutment 104, i.e. at reduced speed.

It is, of course, to be understood that the present invention is, by no means, limited to the particular constructions shown in the drawings but also comprises any modifications within the scope of the appended claims.

What we claim is:

1. In combination with a machine tool having a bed: a movable support in the form of a carriage movable on the bed; a casing connected to said bed; a planetary gear transmission arranged in said casing and including a worm wheel forming a planetary gear carrier, planetary gears rotatably journalled in said planetary gear carrier, and the two sun wheels meshing with said planetary gears; driving means for selectively effecting a fast traverse or a feed movement of said support; a worm meshing with said worm wheel; transmission means drivingly connecting said driving means with said worm and with one of said sun wheels; a feed spindle drivingly connected to the other of said sun wheels; said spindle operatively engaging said support; cam means carried by said support; means on the bed cooperating with said cam means including fixed abutment means for limiting the maximum travel of said support and yieldable abutment means for creating resistance to movement of said support at at least one point in the travel thereof; a worm shaft fixedly connected to said worm and axially displaceably mounted in said casing; yieldable spring means acting upon said worm shaft and yieldable to permit movement of said worm shaft in the axial direction thereof; electric switch means electrically connected to said driving means; and actuating means connected to said worm shaft for movement thereby when the worm shaft moves axially and operable for actuating said switch means when said actuating means is moved in response to axial movement of said worm shaft as brought about by engagement of said abutment means by said cam means.

2. In combination with a machine tool having a bed; a transmission casing connected to said bed; a planetary gear transmission arranged in said casing; a worm wheel forming a planetary gear carrier as a part of said transmission; planetary gears rotatably journalled in said planetary gear carrier, and two sun wheels meshing with said planetary gears; an electric fast traverse motor having a shaft and one of said sun wheels being fixedly connected thereto; an electric feed motor; a worm meshing with said worm wheel; transmission means drivingly connecting said feed motor with said worm; a feed spindle drivingly connected to the other of said sun wheels; said support being threadedly connected to said feed spindle; cam means connected to said support; means on the bed cooperating with said cam means including fixed abutment means for limiting the maximum travel of said support and yieldable abutment means for creating resistance to movement of said support at at least one point in the travel thereof; a worm shaft connected to said worm and axially displaceably mounted in said casing; spring means acting upon said worm shaft tending to hold the worm shaft in a certain axial position and adapted to permit the worm shaft to move in axial direction thereof; electric switch means electrically connected to said traverse motor and said feed motor; and actuating means connected to said worm shaft for movement thereby when the worm shaft moves axially and operable for controlling said switch means in response to axial movement of said worm shaft as brought about by engagement of said abutment means by said cam means.

3. In combination in a control unit for connection to a chip removing machine tool: said machine tool having a bed and a support movable thereon and a feed spindle threaded to the support; a casing; a planetary gear transmission arranged in said casing and including a worm wheel forming a planetary gear carrier, planetary gears rotatably journalled in said planetary gear carrier, and two sun wheels meshing with said planetary gears; electrically controlled driving means adapted to be drivingly connected to one of said sun wheels; a worm meshing with said worm wheel; transmission means drivingly connecting said worm with said electrically controllable driving means; a shaft connected to the other of said sun wheels and extending through said casing for driving connection with the feed spindle of the machine tool; a worm shaft connected to said worm and axially displaceably mounted in said casing; spring means acting upon said worm shaft and tending to hold the same in a certain axial position; electric switch means for controlling said electrically controllable driving means; means responsive to axial movement of said worm shaft in either direction for actuating said electric switch means; and means carried by the support and by said bed operable in response to movement of the support on the bed for causing axial movement of said worm shaft.

4. In combination in a control unit for a detachable connection to a chip removing machine tool: said machine tool having a bed and a support movable thereon and a feed spindle threaded to the support; a casing; a planetary gear transmission arranged in said casing and including a worm wheel forming a planetary gear carrier, planetary gears rotatably journalled in said planetary gear carrier, and two sun wheels meshing with said planetary gears; an electric fast traverse motor with a shaft having one of said sun wheels fixedly connected thereto; an electric feed motor; a worm meshing with said worm wheel; transmission means drivingly connecting said worm with said motors; means connecting said spindle drivingly to the other of said sun wheels; said spindle being threadedly connected to said support; a worm shaft connected to said worm and axially displaceably mounted in said casing; yieldable spring means acting upon said worm shaft and tending to hold the same in a certain predetermined axial position; electric switch means electrically connected to said motors; means connected to said worm shaft and adapted in response to an axial movement of the latter in either direction to actuate said switch means for controlling said motors; and means carried by the support and by said bed operable in response to movement of the support on the bed for causing axial movement of said worm shaft.

5. In combination with a machine tool having a bed; a casing connected to said bed; a planetary gear transmission arranged in said casing and including a worm wheel forming a planetary gear carrier, planetary gears rotatably journalled in said planetary gear carrier, and two sun wheels meshing with said planetary gears; an electrically controllable drive motor having a shaft; a worm meshing with said worm wheel; transmission means drivingly connected to said motor shaft and said worm; electrically operable clutch means operable selectively to effect driving connection between one of said sun wheels and said motor; a feed spindle drivingly connected to the other of said sun wheels; a support movable on said bed and operatively connected to said feed spindle; cam means connected to said movable support; means on the bed cooperating with said cam means including fixed abutment means for limiting the maximum travel of said support and yieldable abutment means for creating resistance to movement of said support at at least one point in the travel thereof; a worm shaft fixedly connected to said worm wheel and axially displaceably mounted in said casing; yieldable spring means acting upon said worm shaft and tending to maintain the same in a certain predetermined position; electric switch means electrically connected to said motor and said clutch means; and means operable in response to a predetermined resistance to movement of said support on said bed to effect an axial movement of said worm shaft to thereby actuate said switch means for controlling said motor and said clutch means.

6. In combination with a machine tool having a bed: said machine tool having a bed and a support movable thereon and a feed spindle threaded to the support; a casing detachably connected to said machine tool; a planetary gear transmission arranged in said casing and including a worm wheel forming a planetary gear carrier, planetary gears rotatably journalled in said planetary gear carrier, and two sun wheels meshing with said planetary gears; driving means for selectively effecting a fast traverse or a feed movement of said support; a worm meshing with said worm wheel; transmission means drivingly connecting said driving means with said worm; said driving means being adapted to drive said sun wheels; a feed spindle drivingly connected to one of said sun wheels; said support being operatively connected to said feed spindle; cam means connected to said movable support; means on the bed cooperating with said cam means including fixed abutment means for limiting the maximum travel of said support and yieldable abutment means for creating resistance to movement of said support at at least one point in the travel thereof; a worm shaft fixedly connected to said worm and axially displaceably mounted in said casing; a lever having one end in engagement with said worm shaft and being movable therewith; two additional levers spaced from each other and engaged by the other end of said first mentioned lever; yieldable spring means interposed between said two additional levers and acting in a direction substantially parallel to said worm shaft and resiliently urging said levers and worm shaft toward a certain position; and electric limit switch means electrically connected to said driving means and operable by said additional levers, said worm shaft being axially movable in response to resistance to movement of said support as brought about by engagement of said abutment means by said cam means.

7. In combination with a machine tool having a bed: said machine tool having a bed and a support movable thereon and a feed spindle threaded to the support; a casing connected to said bed; a planetary gear transmission arranged in said casing and including a worm wheel forming a planetary gear carrier, planetary gears rotatably journalled in said planetary gear carrier, and two sun wheels meshing with said planetary gears; driving means for selectively effecting a fast traverse or a feed movement of said support; a worm meshing with said worm wheel; transmission means drivingly connecting said driving means with said worm; said driving means being adapted to drive one of said sun wheels; a feed spindle drivingly connected to the other of said sun wheels; said support being connected to said feed spindle; cam means connected to said movable support; means on the bed cooperating with said cam means including fixed abutment means for limiting the maximum travel of said support and yieldable abutment means for creating resistance to movement of said support at at least one point in the travel thereof; a worm shaft fixedly connected to said worm and axially displaceably mounted in said casing; a first lever engaging said worm shaft and axially movable in said casing; a second lever operable by said first lever and provided with two arms; two limit switches respectively engageable by said two arms and electrically connected to said driving means; and yieldable spring means associated with said two arms and acting upon the latter in a direction opposite to the direction of movement of the respective arms when acting on said limit switches, said worm shaft being axially movable in response to resistance to movement of said support as brought about by engagement of said abutment means by said cam means.

8. In combination with a machine tool having a bed: a support movable on said bed; a casing connected to said bed; a planetary gear transmission arranged in said casing and including a worm wheel forming a planetary gear carrier, planetary gears rotatably journalled in said planetary gear carrier, and two sun wheels meshing with said planetary gears; driving means for selectively effecting a fast traverse or a feed movement of said support; a worm meshing with said worm wheel; transmission means drivingly connecting said driving means with said worm; said driving means being adapted to drive one of said sun wheels; a feed spindle drivingly connected to the other of said sun wheels; said support being operatively connected to said spindle; cam means connected to said movable support; means on the bed cooperating with said cam means including fixed abutment means for limiting the maximum travel of said support and yieldable abutment means for creating resistance to movement of said support at at least one point in the travel thereof; a worm shaft fixedly connected to said worm and axially displaceably mounted in said casing; rod means rotatable in the casing engaging said worm shaft and rotatable in response to axial movement of the worm shaft in said casing; a lever fixed to said rod means and provided with two arms; two limit switches respectively engageable by said two arms and electrically connected to said driving means; two yieldable spring means respectively associated with said limit switches and acting upon the latter in a direction opposite to the respective arms acting on said limit switches; each of said limit switches being movable into two different positions; and additional yieldable spring means interposed between said two yieldable spring means and operable operatively to engage each of said limit switches when the latter are moved a predetermined distance by their respective arms, said worm shaft being axially movable in response to resistance to movement of said support as brought about by engagement of said abutment means by said cam means.

9. In combination with a machine tool having a bed: a transmission casing connected to said bed; a planetary gear transmission arranged in said casing and including a worm wheel forming a planetary gear carrier, planetary gears rotatably journalled in said planetary gear carrier, and two sun wheels meshing with said planetary gears; an electric fast traverse motor with a shaft having one of said sun wheels fixedly connected thereto; an electric feed motor; a globoidal worm meshing with said worm wheel, said globoidal worm having a hollow shaft fixed thereto axially displaceably mounted in said casing; a feed spindle drivingly connected to the other of said sun wheels; a support movable on said bed and operatively connected to said feed spindle; cam means connected to said movable support; means on the bed cooperating with said cam means including fixed abutment means for limiting the maximum travel of said support and yieldable abutment means for creating resistance to movement of said support at at least one point in the travel thereof; an additional shaft extending through the hollow shaft of said globoidal worm; transmission means drivingly connecting said feed motor with said additional shaft; said additional shaft being drivingly connected to said hollow shaft; rod means operatively engaging said additional shaft and rotatable by axial movement of said additional shaft; a two-arm lever operable by said rod means; two limit switches respectively operable by the arms of said two-arm lever; and two spring means respectively associated with said two limit switches and acting in a direction counter to the respective arms of said two-arm lever, said additional shaft being axially movable in response to resistance to movement of said support as brought about by engagement of said abutment means by said cam means.

10. In combination with a machine tool having a bed: a transmission casing connected to said bed; a planetary gear transmission arranged in said casing and including a worm wheel forming a planetary gear carrier, planetary gears rotatably journalled in said planetary gear carrier, and two sun wheels meshing with said planetary gears; an electric fast traverse motor with a shaft having one of said sun wheels drivingly connected thereto; an electric feed motor; a worm meshing with said worm wheel and having a hollow shaft; an additional shaft extending through said hollow shaft; a feed spindle drivingly connected to the other of said sun wheels; a support movable on the bed and movably connected to said feed spindle; cam means connected to said movable support; means on the bed cooperating with said cam means including fixed abutment means for limiting the maximum travel of said support and yieldable abutment means for creating resistance to movement of said support at at least one point in the travel thereof; a differential transmission comprising a first bevel gear keyed to said hollow shaft and also comprising a second and a third bevel gear meshing with said first bevel gear and further comprising a fourth bevel gear meshing with said second and third gears and fixed to said additional shaft; means connecting said additional shaft with said feed motor; shaft means supporting said second and third bevel gears; two limit switches electrically connected to said motors; actuating means respectively associated with said limit switches for actuating the same; said actuating means being operable by said shaft means; and spring means respectively associated with said actuating means and acting in a direction counter to the action of said actuating means for actuating said limit switches, said shaft means being axially movable in response to resistance to movement of said support as brought about by engagement of said abutment means by said cam means.

11. In combination with a machine tool having a bed: a transmission casing connected to said bed; a planetary gear transmission arranged in said casing and including a worm wheel forming a planetary gear carrier, planetary gears rotatably journalled in said planetary gear carrier, and two sun wheels meshing with said planetary gears; an electric fast traverse motor with a shaft having one of said sun wheels fixedly connected thereto; an electric feed motor; a worm meshing with said worm wheel; transmission means drivingly connecting said feed motor with said worm; a feed spindle drivingly connected to the other of said sun wheels; a support movable on said bed and movably connected to said feed spindle; cam means connected to said movable support; means on the bed cooperating with said cam means including fixed abutment means for limiting the maximum travel of said support and yieldable abutment means for creating resistance to movement of said support at at least one point in the travel thereof; a worm shaft connected to said worm and axially displaceably mounted in said casing; spring means acting upon said worm shaft tending to hold the same in a certain position and adapted to yield to permit movement thereof in axial direction thereof; electric switch means electrically connected to said fast traverse motor and said feed motor; actuating means movably connected to said worm shaft for controlling said switch means in response to an axial movement of said worm shaft; and brake means associated with said fast traverse motor and operable to absorb the inertia of the feed motor when the feed motor is de-energized for quickly stopping the same, said worm shaft being axially movable in response to resistance to movement of said support as brought about by engagement of said abutment means by said cam means.

12. An arrangement according to claim 4, in which with the exception of said motors all of the parts including at least a portion of said spindle are arranged within said casing.

13. In combination with a machine tool having a bed: a transmission casing connected to said bed; a planetary gear transmission arranged in said casing and including a worm wheel forming a palnetary gear carrier, planetary gears rotatably journalled in said planetary gear carrier, and two sun wheels meshing with said planetary gears; an electric fast traverse motor with a shaft having one of said sun wheels fixedly connected thereto; an electric feed motor; a worm meshing with said worm wheel; transmission means drivingly connecting said feed motor with said worm; said transmission means including exchangeable change gears; a feed spindle drivingly connected to the other of said sun wheels; a support movable on said bed and movably connected to said feed spindle; cam means connected to said movable support; means on the bed cooperating with said cam means including fixed abutment means for limiting the maximum travel of said support and yieldable abutment means for creating resistance to movement of said support at at least one point in the travel thereof; a worm shaft connected to said worm and axially displaceably mounted in said casing; spring means acting upon said worm shaft tending to hold the same in a certain position and adapted to yield to permit movement therof in axial direction thereof; electric switch means electrically connected to said fast traverse motor and said feed motor; and actuating means movably connected to said worm shaft operable for controlling said switch means in response to an axial movement of said worm shaft, said worm shaft being axially movable in response to resistance to movement of said support as brought about by engagement of said abutment means by said cam means.

14. In combination with a machine tool having a bed: a transmission casing connected to said bed; a planetary gear transmission arranged in said casing and including a worm wheel forming a planetary gear carrier, planetary gears rotatably journalled in said planetary gear carrier, and two sun wheels meshing with said planetary gears; an electric fast traverse motor with a shaft having one of said sun wheels fixedly connected thereto; an electric feed motor; a worm meshing with said worm wheel; transmission means including differential gear means and drivingly connecting said feed motor with said worm; a feed spindle drivingly connected to the other of said sun wheels; a support movable on said bed and movably connected to said feed spindle; cam means connected to said movable support; means on the bed cooperating with said cam means including fixed abutment means for limiting the maximum travel of said support and yieldable abutment means for creating resistance to movement of said support at at least one point in the travel thereof; a worm shaft connected to said worm and axially displaceably mounted in said casing; spring means acting upon said worm shaft tending to yield to hold the same in a certain position and adapted to yield to permit movement thereof in axial direction thereof; electric switch means electrically connected to said fast traverse motor and said feed motor; and actuating means movably connected to said worm shaft for controlling said electric switch means in response to an axial movement of said worm shaft, said worm shaft being axially movable in response to resistance to movement of said support as brought about by engagement of said abutment means by said cam means.

15. In combination with a machine tool having a bed: a transmission casing connected to said bed; a planetary gear transmission arranged in said casing and including a worm wheel forming a planetary gear carrier, planetary gears rotatably journalled in said planetary gear carrier, and two sun wheels meshing with said planetary gears; an electric fast traverse motor with a shaft having one of said sun wheels fixedly connected thereto; an electric feed motor; a worm meshing with said worm wheel; transmission means drivingly connecting said feed motor with said worm; a feed spindle drivingly connected to the other of said sun wheels; a support movable on said bed and movably connected to said feed spindle; cam means connected to said movable support; means on the bed cooperating with said cam means including fixed abutment means for limiting the maximum travel of said support and yieldable abutment means for creating resistance to movement of said support at at least one point in the travel thereof; a worm shaft connected to said worm and axially displaceably mounted in said casing; a bearing sleeve surrounding a portion of said axially displaceable worm shaft; a rotatable rod having a tooth at one end thereof engaging said bearing sleeve; a resilient shift lever connected to the other end of said rod; two spring means arranged on opposite sides of said shift lever; electric limit switches electrically connected to said motors and arranged at opposite sides of said resilient shift lever, said resilient shift lever being adapted to actuate said limit switches; at least one fixed abutment and one adjustable abutment at each side of said resilient shift lever; said fixed and adjustable abutments being arranged between the free end of said resilient shift lever and the connection of the latter with said rod in such a way that said resilient shift lever will be able to engage said fixed and said adjustable abutments only after one of said springs has been compressed and after one of said limit switches has been actuated, said worm shaft being axially movable in response to resistance to movement of said support as brought about by engagement of said abutment means by said cam means.

16. A feed transmission for electrically controlled machine tools, which comprises in combination, a feed motor, a fast traverse motor, a planetary gear transmission operatively connected to both of said motors, an output shaft adapted selectively to be driven by said feed motor or said fast traverse motor through said planetary gear transmission, a worm movable in axial direction, a worm wheel arranged for cooperation with said worm and operatively connected with said planetary gear transmission, a pair of limit switch means operable respectively to bring about a change in the state of operation of said motors, pre-loaded spring means arranged for cooperation with said axially movable worm and operable in two different directions for respectively actuating one or the other of said switch means, means adapted in response to a pressure exceeding the pre-load of said spring means to bring about operation of one of said limit switch means, and means to resist movement of said output shaft to cause axial movement of said worm.

17. A feed transmission for electrically controlled machine tools, which comprises in combination, a feed motor, a fast traverse motor, a planetary gear transmission operatively connected to said motors, an output shaft operatively connected to said planetary gear transmission, a worm wheel operatively connected with said feed motor and said output shaft, a hollow worm shaft, a globoidal worm mounted on said worm shaft and engaging said worm wheel, shaft means arranged in said globoidal worm, change gears operatively connected with said shaft means and said feed motor, said worm shaft and said shaft means being provided with interengaging helical threads, pre-loaded spring means operatively engaging said shaft means and tending to hold the shaft means in a certain axial position, switch means operatively connected with said motors and adapted to bring about a change in the state of operation of at least one of said motors, a predetermined torque load on said shaft means causing said helical thread to overcome the thrust of said spring means and bring about axial movement of said shaft means; means operated by axial movement of said shaft means to cause actuation of said switch means, and means for resisting movement of said output shaft to bring about said axial movement of said shaft means.

18. A feed transmission for electrically controlled machine tools, which comprises in combination, a feed motor, a fast traverse motor, a planetary gear transmission operatively connected to said motors, an output shaft operatively connected to said planetary gear transmission, a worm wheel operatively connected with said feed motor and said output shaft, a hollow worm shaft, a globoidal worm mounted on said worm shaft and engaging said worm wheel, shaft means arranged in said globoidal worm, change gears operatively connected with said shaft means and said feed motor, a bevel gear mounted on the shaft means arranged in said hollow worm shaft, bridge shaft means extending transversely to the axis of said bevel gear, two planetary gears respectively mounted on the ends of said bridge shaft means and meshing with said bevel gear, bevel gear means drivingly connected to said worm shaft and meshing with said planetary gears, said bevel gear being adapted to drive said bevel gear means and said worm, spring means urging said bridge shaft means toward a certain position, transmitting means operatively connected with said bridge shaft means and provided with sloped surfaces adapted to act against the thrust of said spring means, switch means connected to said motors, and means operated by said transmitting means to bring about actuation of said switch means when said bridge shaft means moves.

19. A feed transmission according to claim 17, which includes braking means associated with said fast traverse motor and adjusted in conformity with the maximum admissable torque of the feed transmission, said brake being energized when the fast traverse motor is de-energized, and means adapted in response to said torque being exceeded to actuate said brake means through said planetary gear transmission in order without shock to absorb or destroy overloads which may occur through overloading said fast speed motor or the run-out of said feed motor.

20. A feed transmission for electrially controlled machine tools, which comprises in combination, a feed motor, a fast traverse motor, a planetary gear transmission operatively connected to said motors, an output shaft operatively connected to said planetary gear transmission, change gears operatively connecting said feed motor with said transmission, a worm wheel drivingly connected with said planetary gear transmission, an axially movable gear member arranged for driving connection with said worm wheel, and axially movable in response to a predetermined torque load on said worm wheel, pre-loaded spring means effective in two directions operatively engaging said gear member and urging the same toward a certain axial position, electric switch means operatively connected with said motors and operable in response to an axial movement of said gear member to bring about a change in the state of operation of said motors, and means to resist movement of said output shaft to cause said axial movement of said gear member.

21. A feed transmission for electrically controlled machine tools, which comprises in combination, a feed motor, a fast traverse motor, gearing means including a planetary gear transmission operatively connected to said motors, a worm wheel drivingly connected to said planetary gear transmission, and an axially movable gear member meshing with said worm wheel and axially movable in response to a predetermined torque load on said worm wheel, an output shaft operatively connected to said worm wheel, change gears operatively connecting said feed motor with said transmission, pre-loaded spring means operative in two directions operatively engaging said gear member and urging the same toward a certain axial position, switch means respectively operable in response to axial movement of said gear member for varying the state of operation of said motors, and means to resist movement of said output shaft to cause said axial movement of said gear member.

22. A composite transmission, which comprises in combination, a feed transmission for electrically controlled machine tools, a feed motor, a fast traverse motor, a planetary gear transmission operatively connected to said motors, a worm wheel drivingly connected to said planetary gear transmission, an axially movable gear member meshing with said worm wheel, an output shaft drivingly connected to said worm wheel, pre-loaded spring means operatively connected with said axially movable gear member urging the same toward a certain axial position, switch means operable in response to axial movement of said gear member and operable for respectively controlling said motors, an auxiliary transmission operatively connected with said planetary gear transmission, a casing housing said auxiliary gear transmission, and means connecting said auxiliary gear transmission to said feed gear transmission, and means to resist movement of said output shaft to cause said axial movement of said gear member.

23. A transmission unit adapted to be connected as packaged unit to electrically controlled machine tools, which comprises in combination: a fast traverse motor, a feed motor, an output shaft arranged for connection with the feed spindle of a carriage of a machine tool, gear means including a planetary gear system drivingly connecting said output shaft with both of said motors and including a worm wheel, pre-loaded spring means arranged to be effective in two opposite directions, actuating means arranged for engagement with said spring means, said spring means continuously urging said actuating means into a central position, said gear means including an axially movable gear member meshing with said worm wheel and connected to said actuating means whereby in response to a predetermined axial movement thereof to actuate said actuating means, said axially movable gear member being arranged to effect an axial movement in response to a certain resistance encountered by said output shaft, and limit switch means operable in response to the actuation of said actuating means to bring about a change in the state of operation of at least one of said motors, and means to resist movemen of said ouput shaft to cause said axial movement of said gear member.

References Cited in the file of this patent

UNITED STATES PATENTS

| | | |
|---|---|---|
| 1,837,803 | Weston | Dec. 22, 1931 |
| 2,300,343 | Clay | Oct. 27, 1942 |
| 2,484,616 | Dulaney | Oct. 11, 1949 |
| 2,519,042 | Granberg et al. | Aug. 15, 1950 |